(12) United States Patent
Karp

(10) Patent No.: US 7,077,152 B2
(45) Date of Patent: Jul. 18, 2006

(54) MICROFLUIDIC METERING SYSTEMS AND METHODS

(75) Inventor: Christoph D. Karp, Pasadena, CA (US)

(73) Assignee: Nanostream, Inc., Pasadena, CA (US)

( * ) Notice: Subject to any disclaimer, the term of this patent is extended or adjusted under 35 U.S.C. 154(b) by 455 days.

(21) Appl. No.: 10/141,011

(22) Filed: May 6, 2002

(65) Prior Publication Data

US 2003/0005967 A1 Jan. 9, 2003

Related U.S. Application Data

(60) Provisional application No. 60/303,520, filed on Jul. 7, 2001.

(51) Int. Cl.
*F15C 21/00* (2006.01)

(52) U.S. Cl. .................... 137/15.18; 137/806; 137/826; 137/833; 204/601; 422/100

(58) Field of Classification Search ................ 137/806, 137/15.18, 833, 825, 827, 557, 828; 204/601; 422/100

See application file for complete search history.

(56) References Cited

U.S. PATENT DOCUMENTS

| 3,471,262 A | 10/1969 | Hrdina | 230/23 |
| 3,756,459 A | 9/1973 | Bannister et al. | 222/1 |

(Continued)

FOREIGN PATENT DOCUMENTS

| WO | WO 99/17093 | 4/1999 |
| WO | WO 99/19717 | 4/1999 |
| WO | WO 99/60397 | 11/1999 |
| WO | WO 00/21659 | 4/2000 |
| WO | WO 01/04909 | 1/2001 |
| WO | WO 01/74490 | 10/2001 |
| WO | WO 02/22250 A2 | 3/2002 |
| WO | WO 03/037491 | 5/2003 |

OTHER PUBLICATIONS

Puntambekar, et al., "An Air–Driven Fluidic Multiplexer Integrated with Microdispensers," *Micro Total Analysis Systems*, J.M. Ramsey and A. van den Berg (eds.), Kluwer Academic Publishers, The Netherlands, 2001, pp. 78–80.

Tracey, et al., "Microfluidic Mixer Employing Temporally–Interleaved Liquid Slugs and Parabolic Flow," *Micro Total Analysis Systems*, J.M. Ramsey and A. van den Berg (eds.), Kluwer Academic Publishers, The Netherlands, 2001, pp. 141–142.

Handique, K., et al., "Nanoliter Liquid Metering in Microchannels Using Hydrophobic Patterns," Analytical Chemistry, vol. 72, No. 17, pp. 4100–4109 (2000).

Voldman, Joel et al., An Integrated Liquid Mixer/Valve, "Journal of Microelectronmechanical Systems," vol. 9, No. 3, Sep. 2000, pp. 295–302.

*Primary Examiner*—A. Michael Chambers
(74) *Attorney, Agent, or Firm*—Vincent K. Gustafson; Intellectual Property/Technology Law

(57) ABSTRACT

Systems and methods for metering microfluidic volumes are provided. A discrete plug may be separated from a larger volume of first fluid by injecting a second fluid, such as a gas, into a channel containing the first fluid. The injection of the second fluid to isolate the desired amount of the first fluid may be controlled through timing of flows, visual indicators and/or automated control systems using optical or electrical sensors.

37 Claims, 13 Drawing Sheets

U.S. PATENT DOCUMENTS

| | | | | |
|---|---|---|---|---|
| 4,259,291 A | | 3/1981 | Smythe | 422/82 |
| 4,426,451 A | * | 1/1984 | Columbus | 436/518 |
| 4,676,274 A | | 6/1987 | Brown | 137/806 |
| 4,868,129 A | | 9/1989 | Gibbons et al. | 436/179 |
| 5,789,045 A | * | 8/1998 | Wapner et al. | 428/903 |
| 5,800,690 A | | 9/1998 | Chow et al. | 204/451 |
| 5,834,314 A | | 11/1998 | Gates et al. | 436/52 |
| 5,880,071 A | | 3/1999 | Parce et al. | 204/453 |
| 5,922,591 A | | 7/1999 | Anderson et al. | 435/287.2 |
| 5,976,336 A | | 11/1999 | Dubrow et al. | 204/453 |
| 6,074,725 A | | 6/2000 | Kennedy | 428/188 |
| 6,117,396 A | | 9/2000 | Demers | 422/100 |
| 6,152,181 A | * | 11/2000 | Wapner et al. | 137/807 |
| 6,193,471 B1 | | 2/2001 | Paul | 417/53 |
| 6,453,928 B1 | * | 9/2002 | Kaplan et al. | 137/14 |
| 6,494,614 B1 | | 12/2002 | Bennett et al. | 366/336 |
| 6,499,499 B1 | * | 12/2002 | Dantsker et al. | 137/1 |
| 6,537,506 B1 | | 3/2003 | Schwalbe et al. | 422/130 |
| 6,601,613 B1 | * | 8/2003 | McNeely et al. | 137/833 |

* cited by examiner

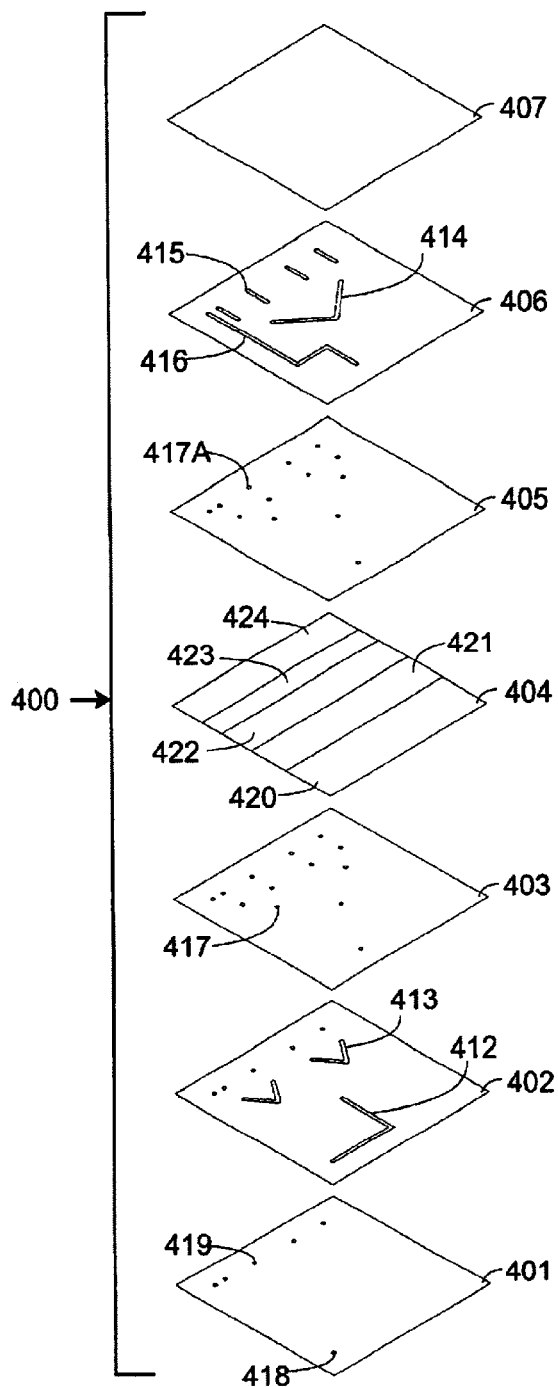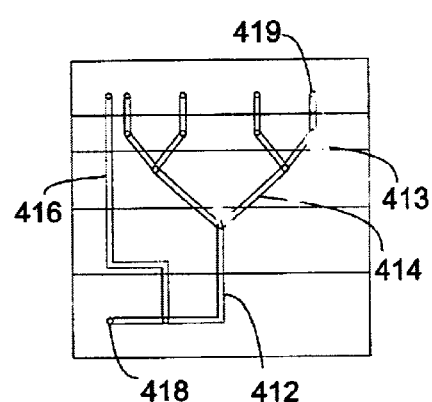
FIG. 5A
FIG. 5B

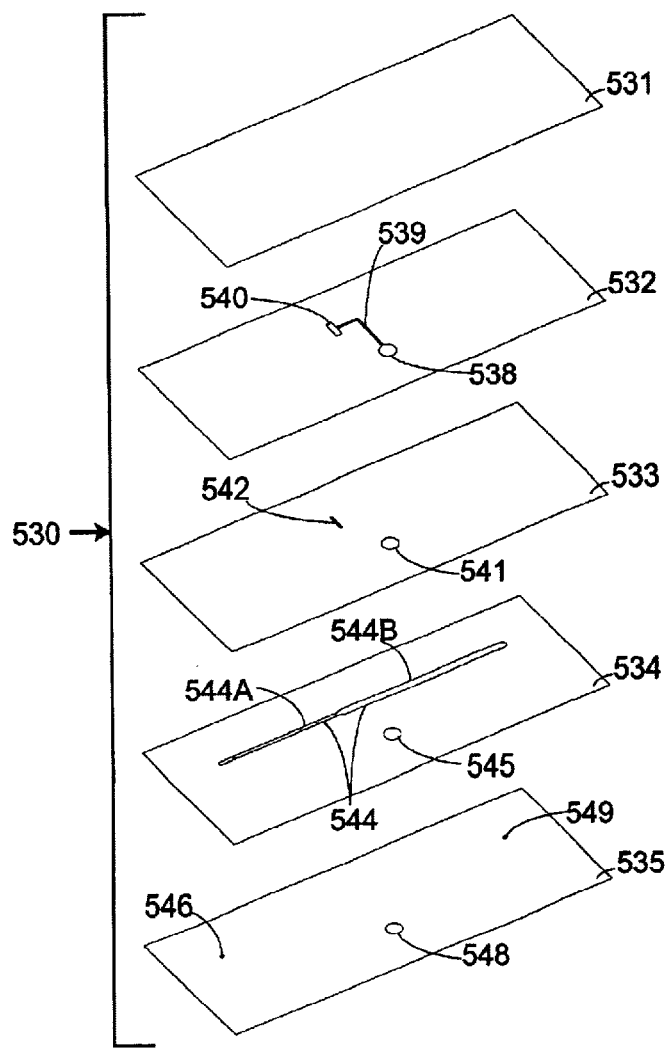
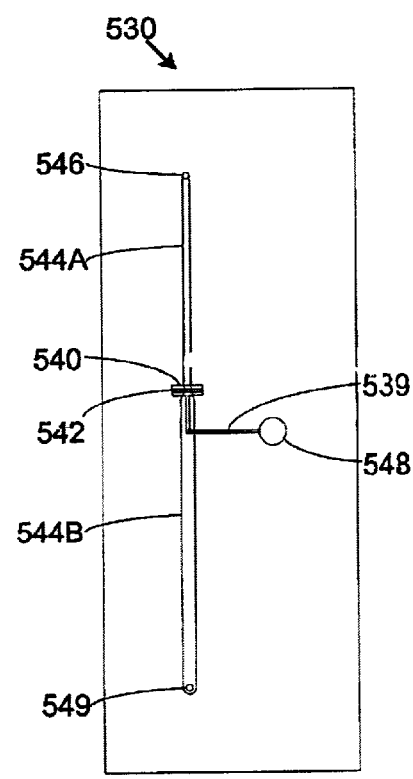
FIG. 7A
FIG. 7B

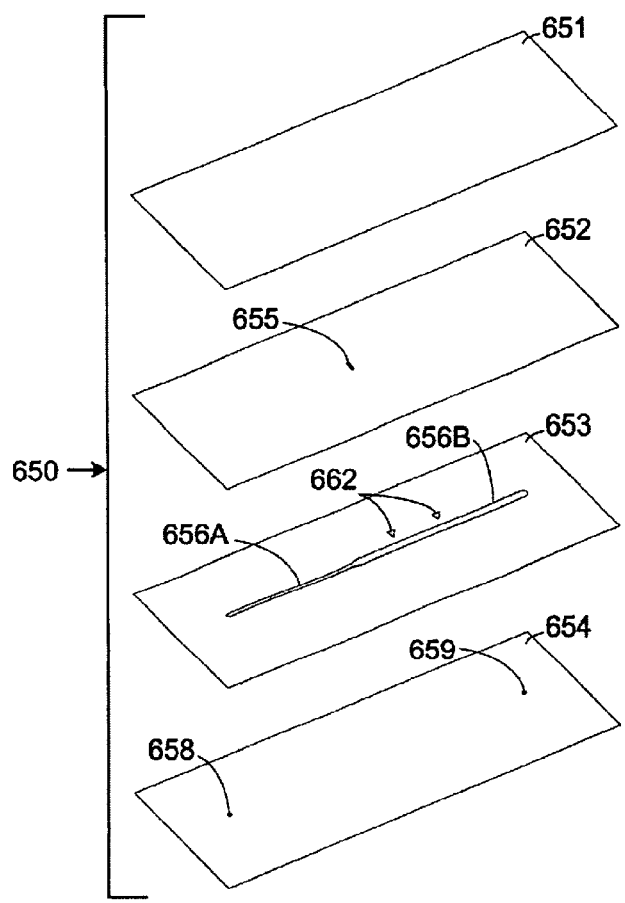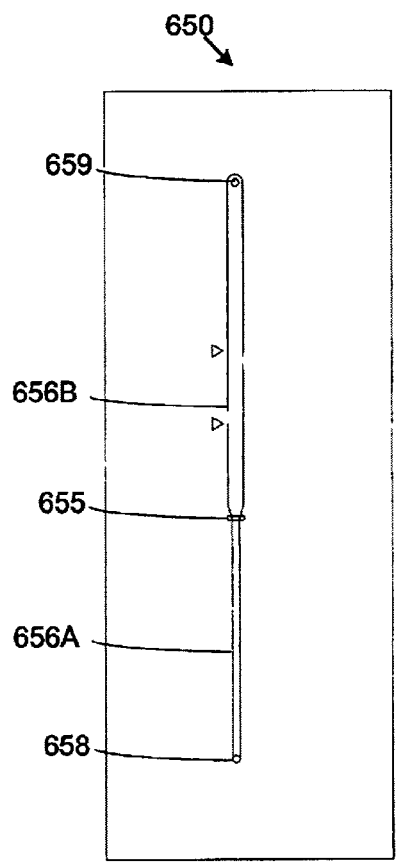
FIG. 14A
FIG. 14B

MICROFLUIDIC METERING SYSTEMS AND METHODS

STATEMENT OF RELATED APPLICATION(S)

This application claims priority to U.S. Provisional Patent Application Ser. No. 60/303,520, filed Jul. 7, 2001 and currently pending.

FIELD OF THE INVENTION

The present invention relates to microfluidic devices and the control and metering of fluid within those devices. These devices are useful in various biological and chemical systems, particularly in systems where fluid metering is important, as well as in combination with other liquid-distribution devices.

BACKGROUND OF THE INVENTION

There has been a growing interest in the manufacture and use of microfluidic systems for the acquisition of chemical and biological information. In particular, when conducted in microfluidic volumes, complicated biochemical reactions may be carried out using very small volumes of liquid. Among other benefits, microfluidic systems increase the response time of reactions, minimize sample volume, and lower reagent consumption. When volatile or hazardous materials are used or generated, performing reactions in microfluidic volumes also enhances safety and reduces disposal quantities.

Traditionally, microfluidic systems have been constructed in a planar fashion using techniques borrowed from the silicon fabrication industry. Representative systems are described, for example, in some early work by Manz et al. (Trends in Anal. Chem. (1990) 10(5): 144–149; Advances in Chromatography (1993) 33: 1–66). In these publications, microfluidic devices are constructed by using photolithography to define channels on silicon or glass substrates and etching techniques to remove material from the substrate to form the channels. A cover plate is bonded to the top of the device to provide closure.

More recently, a number of methods have been developed that allow microfluidic devices to be constructed from plastic, silicone or other polymeric materials. In one such method, a negative mold is first constructed, and plastic or silicone is then poured into or over the mold. The mold can be constructed using a silicon wafer (see, e.g., Duffy et al., Analytical Chemistry (1998) 70: 4974–4984; McCormick et. al., Analytical Chemistry (1997) 69: 2626–2630), or by building a traditional injection molding cavity for plastic devices. Some molding facilities have developed techniques to construct extremely small molds. Components constructed using a LIGA technique have been developed at the Karolsruhe Nuclear Research center in Germany (see, e.g., Schomburg et al., Journal of Micromechanical Microengineering (1994) 4: 186–191), and commercialized by Micro-Parts (Dortmund, Germany). Jenoptik (Jena, Germany) also uses LIGA and a hot-embossing technique. Imprinting methods in PMMA have also been demonstrated (see, e.g., Martynova et.al., Analytical Chemistry (1997) 69: 4783–4789) However, these techniques do not lend themselves to rapid prototyping and manufacturing flexibility. Additionally, the foregoing references teach only the preparation of planar microfluidic structures. Moreover, the tool-up costs for both of these techniques are quite high and can be cost-prohibitive.

A more recent method for constructing microfluidic devices uses a KrF laser to perform bulk laser ablation in fluorocarbons that have been compounded with carbon black to cause the fluorocarbon to be absorptive of the KrF laser (see, e.g., McNeely et al., "Hydrophobic Microfluidics," SPIE Microfluidic Devices & Systems I\I , Vol. 3877 (1999)). This method is reported to reduce prototyping time; however, the addition of carbon black renders the material optically impure and presents potential chemical compatibility issues. Additionally, the reference is directed only to planar structures.

When working with fluids in conventional macroscopic volumes, fluid metering is relatively straightforward. In microfluidic volumes, however, fluid metering is considerably more difficult. Most, if not all, microfluidic systems require some interface to the conventional macrofluidic world. Using conventional macrofluidic techniques, the smallest volume of liquid that can be generated is a droplet, typically ranging in volume between about 1–100 microliters. At the low end of this volumetric range it is extremely difficult to consistently create droplets having a reasonably low volumetric standard deviation. Applications in which fluidic metering accuracy is important include microfluidic synthesis, wherein it would be desirable to measure stoichiometric microfluidic volumes of reagents and solvents.

A known method of obtaining small droplets is to combine fluids to be metered with surfactants before dispensing the liquid through a pipet tip. But this method is unacceptable for many applications, since adding surfactants detrimentally compromises the purity of the fluid to be metered, and it may be very challenging to remove the surfactants and purify the fluid for further processing or use.

Accordingly, there exists a need for metering devices and methods capable of consistently metering fluids in microfluidic volumes.

SUMMARY OF THE INVENTION

In another aspect of the invention, a method for generating a plurality of discrete microfluidic volumes of fluid is provided. A microfluidic channel in fluid communication with a first fluid inlet and a second fluid inlet is provided. A first fluid is supplied into the channel at the first fluid inlet. A second fluid is supplied into the channel at the second fluid inlet. The supply conditions of the first fluid and the second fluid are selected to generate discrete plugs of fluid in the channel.

In another aspect of the invention, a method for generating a plurality of discrete microfluidic volumes of fluid is provided. A primary microfluidic channel segment in fluid communication with a first fluid inlet and a second fluid inlet is provided. A first fluid is supplied through the first fluid inlet into the primary channel segment. A second fluid is supplied through the second fluid inlet into the primary channel segment. The first fluid is supplied before the second fluid is introduced and the pressure of the second fluid exceeds the pressure of the first fluid. The introduction of the second fluid divides the first fluid to generate a fluid plug.

In another aspect of the invention, a device for metering a plug of fluid from a larger fluidic volume comprises a primary microfluidic channel segment, a first fluid inlet and a second fluid inlet each in fluid communication with the primary channel segment, and a means for indicating fluidic volume contained in the primary channel segment. A first fluid is supplied through the first fluid inlet into the primary channel segment. Responsive to the indicating means, a second fluid is supplied through the second fluid inlet into the primary channel segment to divide the first fluid.

In another aspect of the invention, a device for metering a plug of fluid from a larger fluidic volume comprises a primary microfluidic channel segment having a nominal cross-sectional area, an inlet channel segment having a nominal cross-sectional area and in fluid communication with the primary channel segment, and a first fluid inlet and a second fluid inlet each in fluid communication with the inlet channel segment. The nominal area of the inlet channel segment is smaller than the nominal area of the primary channel segment. A first fluid is provided to the primary channel segment and a second fluid is supplied through the to the inlet channel segment to divide the first fluid to yield a plug.

In a further aspect of the invention, any of the foregoing separate aspects may be combined for additional advantage.

These and other aspects and objects of the invention will be apparent to one skilled in the art upon review of the following detailed disclosure, drawings, and claims.

BRIEF DESCRIPTION OF THE DRAWINGS

FIG. 3B is a partial side sectional view of the device of FIGS. 3A–3B taken along section line "A"—"A".

FIG. 5A is an exploded perspective view of a microfluidic metering device in accordance with another aspect of the present invention. FIG. 5B is a top view of the assembled device of FIG. 5A.

FIG. 7A is an exploded perspective view of a microfluidic metering device in accordance with another aspect of the present invention. FIG. 7B is a top view of the assembled device of FIG. 7A.

FIG. 8B is a top view of the device of FIGS. 7A–7B in a third operational state.

FIG. 14A is an exploded perspective view of a microfluidic metering device in accordance with another aspect of the present invention. FIG. 14B is a top view of the assembled device of FIG. 14A.

DETAILED DESCRIPTION OF PREFERRED EMBODIMENTS OF THE INVENTION

Definitions

Figures 1A, 1B:
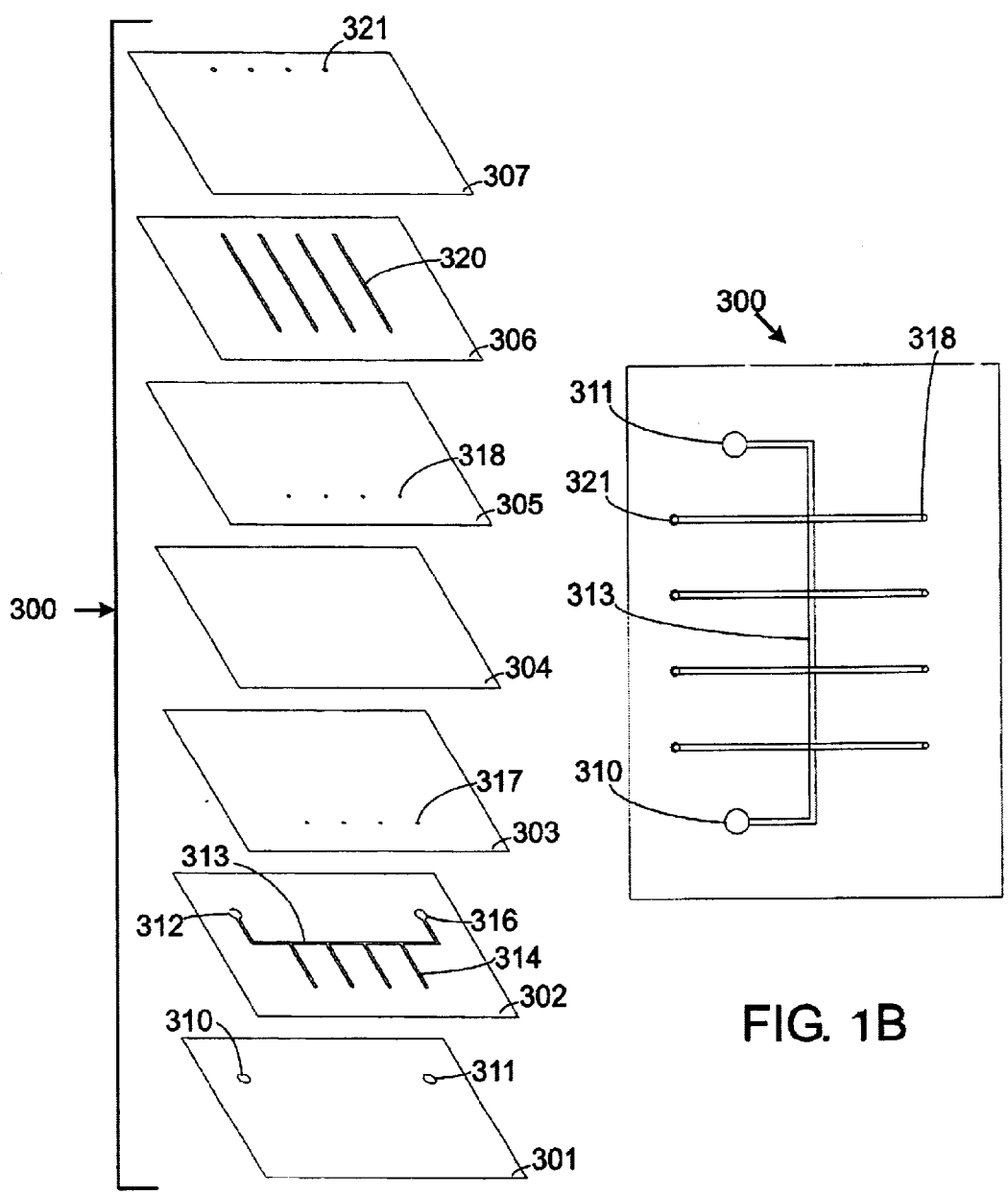
FIG. 1A is an exploded perspective view of a microfluidic metering device in accordance with one aspect of the present invention.
FIG. 1B is a top view of the assembled device of FIG. 1A.

The term "channel" or "chamber" as used herein is to be interpreted in a broad sense. Thus, it is not intended to be restricted to elongated configurations where the transverse or longitudinal dimension greatly exceeds the diameter or cross-sectional dimension. Rather, such terms are meant to comprise cavities or tunnels of any desired shape or configuration through which fluids may be directed. Such a fluid cavity may, for example, comprise a flow-through cell where fluid is to be continually passed or, alternatively, a chamber for holding a specified, discrete amount of fluid for a specified amount of time. "Channels" and "chambers" may be filled with or may contain internal structures comprising, for example, valves, filters, or equivalent components and materials. A microfluidic channel has a smallest dimension that is at least about 1 micron but is less than about 500 microns.

The term "microfluidic" as used herein is to be understood, without any restriction thereto, to refer to structures or devices through which a fluid is capable of being passed or directed, wherein one or more of the dimensions is less than about 500 microns.

The microfluidic devices described here are "generic" in that they are modular and can be easily reconfigured into or adapted to any design. In addition, these devices are capable of being used with a variety of pumping and valving mechanisms, including pressure, peristaltic pumping, electrokinetic flow, electrophoresis, vacuum and the like. In addition, the microfluidic devices of the present invention are capable of being used in collaboration with optical detection (e.g., fluorescence, phosphorescence, luminescence, absorbance and colorimetry), electrochemical detection, and any of various suitable detection methods. Suitable detection methods will depend on the geometry and composition of the device. The choice of such detection methods will be within the purview of the skilled artisan.

The term "microfluidic impedance" as used herein is to be understood, without any restriction thereto, to refer to structures within the microfluidic device that hinder fluid flow. The shape, geometry and material that comprise these devices are not limited to the specific examples provided herein.

The terms "positive pressure" and "negative pressure" as used herein refer to pressures differing from a reference pressure. A preferred reference pressure is atmospheric pressure.

The term "plug" as used herein refers to a discrete portion of fluid typically separated from a larger volume.

The term "self-adhesive tape" as used herein refers to a material layer or film having an integral adhesive coating on one or both sides.

The term "stencil" as used herein refers to a material layer or sheet that is preferably substantially planar, through which one or more variously shaped and oriented channels have been cut or otherwise removed through the entire thickness of the layer, thus permitting substantial fluid movement within the layer (as opposed to simple through-holes for transmitting fluid through one layer to another layer). The outlines of the cut or otherwise removed portions form the lateral boundaries of microstructures that are completed when a stencil is sandwiched between other layers, such as substrates and/or other stencils. Stencil layers can be flexible, thus permitting one or more layers to be manipulated so as not to lie in a plane.

Microfluidic Devices Generally

In an especially preferred embodiment, microfluidic devices according to the present invention are constructed using stencil layers or sheets to define channels for transporting fluids. A stencil layer is preferably substantially planar and has one or more microstructures such as channels cut through the entire thickness of the layer. For example, a computer-controlled plotter modified to manipulate a cutting blade may be used. Such a blade may be used either to cut sections to be detached and removed from the stencil layer, or to fashion slits that separate regions in the stencil layer without removing any material. Alternatively, a computer-controlled laser cutter may be used to cut patterns through the entire thickness of a material layer. While laser cutting may be used to yield precisely-dimensioned microstructures, the use of a laser to cut a stencil layer inherently removes some material. Further examples of methods that may be employed to form stencil layers include conventional stamping or die-cutting technologies. Any of the above-mentioned methods for cutting through a stencil layer or sheet permits robust devices to be fabricated quickly and inexpensively compared to conventional surface micromachining or material deposition techniques used by others to produce fluidic microstructures.

After a portion of a stencil layer is cut or removed, the outlines of the cut or otherwise removed portions form the lateral boundaries of microstructures that are completed upon sandwiching a stencil between substrates and/or other stencils. Upon stacking or sandwiching the device layers together, the upper and lower boundaries of a microfluidic channel within a stencil layer are formed from the bottom and top, respectively, of adjacent stencil or substrate layers. The thickness or height of microstructures such as channels can be varied by altering the thickness of a stencil layer, or by using multiple substantially identical stencil layers stacked on top of one another. When assembled in a microfluidic device, the top and bottom surfaces of stencil layers are intended to mate with one or more adjacent stencil or substrate layers to form a substantially sealed device, typically having one or more fluid inlet ports and one or more fluid outlet ports. A stencil layer and surrounding stencil or substrate layers may be bonded using any appropriate technique.

The wide variety of materials that may be used to fabricate microfluidic devices using sandwiched stencil layers include polymeric, metallic, and/or composite materials, to name a few. In especially preferred embodiments, however, polymeric materials are used due to their inertness and each of manufacture.

When assembled in a microfluidic device, the top and bottom surfaces of stencil layers may mate with one or more adjacent stencil or substrate layers to form a substantially sealed device. In one embodiment, one or more layers of a device may be fabricated from single- or double-sided adhesive tape, although other methods of adhering stencil layers may be used. A portion of the tape (of the desired shape and dimensions) can be cut and removed to form microstructures such as channels. A tape stencil can then be placed on a supporting substrate with an appropriate cover layer, between layers of tape, or between layers of other materials. In one embodiment, stencil layers can be stacked on each other. In this embodiment, the thickness or height of the channels within a particular stencil layer can be varied by varying the thickness of the stencil layer (e.g., the tape carrier and the adhesive material thereon) or by using multiple substantially identical stencil layers stacked on top of one another. Various types of tape may be used with such an embodiment. Suitable tape carrier materials include but are not limited to polyesters, polycarbonates, polytetrafluoroethlyenes, polypropylenes, and polyimides. Such tapes may have various methods of curing, including curing by pressure, temperature, or chemical or optical interaction. The thicknesses of these carrier materials and adhesives may be varied. As an alternative to using tape, an adhesive layer may be applied directly to a non-adhesive stencil or surrounding layer. Examples of adhesives that might be used, either in standalone form or incorporated into self-adhesive tape, include rubber-based adhesives, acrylic-based adhesives, gum-based adhesives, and various other types.

Notably, stencil-based fabrication methods enable very rapid fabrication of robust microfluidic devices, both for prototyping and for high-volume production. Rapid prototyping is invaluable for trying and optimizing new device designs, since designs may be quickly implemented, tested, and (if necessary) modified and further tested to achieve a desired result. The ability to prototype devices quickly with stencil fabrication methods also permits many different variants of a particular design to be tested and evaluated concurrently.

In another preferred embodiment, microfluidic devices according to the present invention are fabricated from materials such as glass, silicon, silicon nitride, quartz, or similar materials. Various conventional surface machining or surface micromachining techniques such as those known in the semiconductor industry may be used to fashion channels, vias, and/or chambers in these materials. For example, techniques including wet or dry etching and laser ablation may be used. Using such techniques, channels may be made into one or more surfaces of a first substrate. A second set of channels may be etched or created in a second substrate. The two substrates are then adhered or otherwise fastened together in such as way that the channels surfaces are facing one another and certain regions may be overlapped to promote mixing. One example of such a device is provided in FIGS. 7A–7B. A second example having an intermediate spacer layer is provided in FIGS. 14A–14B.

Still further embodiments may be fabricated from various materials using well-known techniques such as embossing, stamping, molding, and soft lithography. Additionally, in yet another embodiment, the layers are not discrete, but instead a layer describes a substantially planar section through such a device. Such a microfluidic device can be constructed using photopolymerization techniques such as those described in Cumpston, et al. (1999) Nature 398:51–54.

In addition to the use of adhesives or single- or double-sided tape discussed above, other techniques may be used to attach one or more of the various layers of microfluidic devices useful with the present invention, as would be recognized by one of ordinary skill in attaching materials.

For example, attachment techniques including thermal, chemical, or light-activated bonding; mechanical attachment (including the use of clamps or screws to apply pressure to the layers); or other equivalent coupling methods may be used.

In order to overcome any microfluidic impedances present within a microfluidic device, the differential pressure across an impedance can be increased to allow fluid to flow across the impedance, or the nature of the impedance must change. This can be accomplished in any number of ways.

In a preferred embodiment, the differential pressure is increased by externally applying pressure. The channels and chamber within a microfluidic device can have outlet connections, so an off-board manifold system can be used. The manifold can connect to the inlet and outlet ports of the microfluidic device and switch pressure on and off of these ports in order to provide pressure to the channels when necessary. In one embodiment, this manifold would consist of a valving system that is connected at one end to a nitrogen tank, or other pressurized system. The valving system could be controlled to selectively apply the pressurized nitrogen to the channels of the device. This system could be controlled manually, or by a computer or other built in control. Additionally, feedback to the valving system could be used for this control. In a preferred embodiment, sensors are used to monitor the fluid flow within the device. When the fluid reaches a certain point, the valving system could be automatically switched as per a given protocol.

Preferred Microfluidic Devices

In different aspects of the invention, various metering devices, metering methods, and devices incorporating metering methods are provided.

In one embodiment, a trunk-branch metering method may be used to meter microfluidic quantities of fluid from a larger fluidic volume. For example, referring to FIGS. 1A–1B, a fluidic metering device is constructed in seven layers. Starting from the bottom of the device 300, the first layer 301 defines a fluidic inlet port 310 and outlet port 311 in communication with either end of a trunk channel 313 in the second layer 302. Within the second layer 302, several branch channels 314 in fluid communication with the trunk channel 313 are provided. The third layer 303 defines vias 317 aligned with the ends of the branch channels 314 in the second layer 302. The fourth layer 304 is a porous membrane that inhibits fluid flow at low pressures but permits fluid to pass at higher pressures. The fifth layer 305 defines vias 318 aligned with the vias 317 located in the third layer 303, and the fifth layer vias 318 provide a fluidic path to channels 320 defined in the sixth layer 306. The seventh layer 307 covers the channels 320 in the sixth layer 306 and provides outlet ports 321 disposed at the ends of the channels 320. Aside from the porous fourth layer 304, a wide variety of materials may be used for the other layers. In a preferred embodiment, one or more of the layers are constructed from polymeric materials. In an especially preferred embodiment, one or more layers are fabricated from self-adhesive materials.

In operation, a first fluid of indeterminate volume is supplied through the inlet port 310 and via 312 to the trunk channel 313. From the trunk channel 313, the first fluid fills all of the branch channels 314 before any surplus first fluid exits the device 300 by way of via 316 through the outlet port 311. Thereafter, a second fluid is supplied to the trunk channel 313, such as by manipulating external valves (not shown) to direct the second fluid into the inlet port 310. Preferably (but not necessarily) the first fluid and second fluid are substantially immiscible. A first stream of second fluid provided at a low pressure serves to push or flush the first fluid out of the trunk channel 313, but does not disturb the plugs of first fluid remaining in the branch channels 314. The volume of each of the plugs is about equal to the volume of each branch channel 314. Following the flushing step, the pressure of the second fluid is increased to force the plugs of first fluid upward through the porous membrane 304 by way of the vias 317, 318 into the channels 320 located in the sixth layer 306. Thus, the plugs of first fluid are removed from the branch channels 314 by virtue of a pressure differential between each branch channel 314 and another region. From the channels 314, the first fluid may be pushed toward (and ultimately through) the outlet ports 321, such as for further processing or analysis. Pressure of the second fluid within the trunk channel 313 may be increased, for example, by closing an external valve (not shown) downstream of the outlet port 311 and then increasing the supply pressure of the second fluid. While the second fluid may be most any liquid or gas, it is preferably a gas, and is more preferably an inexpensive and/or inert gas such as air, nitrogen, carbon dioxide, or argon, although other gases may be advantageously used. The first fluid is preferably a liquid, especially in the device 300 shown in FIGS. 1A–1B where a gas-permeable porous region is used to impede the passage of fluid at the end of each branch channel. More preferably, the first fluid is a substantially pure liquid, meaning that it is substantially free of additives or surfactants that might detrimentally interfere with further use or analysis of plugs of the liquid. Notably, use of the porous membrane in the fourth layer 304 also aids in filling the branch channels 314 with the first fluid by providing a route for any air entrained in the branches 314 to be displaced ahead of the incoming fluid. In an alternative embodiment, active valves that provide sealing capability against gas flow may be substituted for the porous impedance regions provided in the device 300. One example of a type of active valve that could be used is provided in FIGS. 6A–6C, wherein a flexible membrane is locally deformed by air pressure to seal fluidic passages. Such an alternative embodiment would, for example, permit the first fluid to be either a liquid or a gas. Since gas is compressible, however, substantially more volumetric uncertainty would result if the desired metering product was in gas phase.

In an alternative embodiment, a first microfluidic channel having an inlet and a first impedance region at the outlet of the channel is provided. A second microfluidic channel is in fluid communication with the first channel at a second impedance region downstream of the fluidic inlet but upstream of the first impedance region. Either the first or second impedance region may be a porous material or a valve. In operation, a stream of first fluid of indeterminate volume is provided to the inlet to fill the first channel to the first impedance region. Once the first channel between the first impedance region and the second impedance region is filled, the excess first fluid is provided diverted through the second impedance region into the second channel, leaving a plug of first fluid in the first channel between the first impedance region and the second impedance region. Thereafter, the plug of first fluid may be transported through the first impedance region, such as by sealing the second channel and supplying a pressurized second fluid to the inlet to contact the plug. Preferably, the first and second channel are part of a multi-layer microfluidic device made with sandwiched stencil layers. Alternatively, other fabrication methods may be used to yield such a metering device.

Figures 2A, 2B:
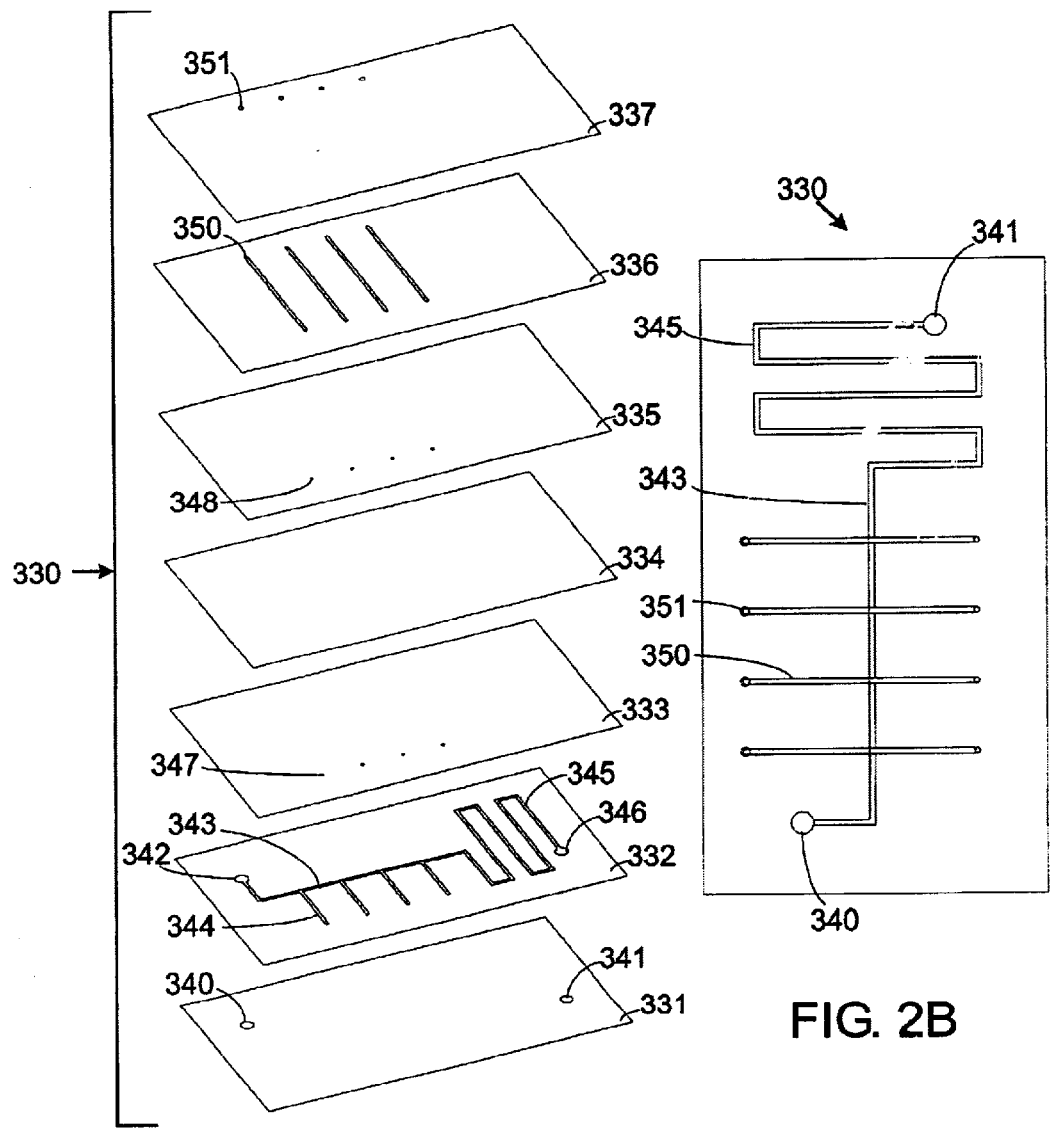
FIG. 2A is an exploded perspective view of a microfluidic metering device in accordance with another aspect of the present invention.
FIG. 2B is a top view of the assembled device of FIG. 2A.

Another embodiment similar to that provided in FIGS. 1A–1B and utilizing a trunk-branch metering method to meter fluids is illustrated in FIGS. 2A–2B. In this example, a microfluidic metering device 330 is constructed in seven layers. As before, the first layer 331 defines an inlet port 340 and outlet port 341. The second layer 332 defines a trunk channel 343, several branch channels 344, a serpentine reservoir channel 345 for collecting surplus fluid, and vias 342, 346 communicating with the trunk channel 343. The reservoir channel 345 is the primary difference between this device 330 and the device 300 illustrated in FIGS. 1A–1B. The third and fifth layers 333, 335 define vias 347, 348 aligned with the ends of the branch channels 344, with a porous membrane used as the fourth layer 334. The sixth layer 336 defines several channels 350 leading to outlet ports defined in the seventh layer 337. Operation of the device 330 is similar to that of the device 300 in the previous example, except for the steps of filling and flushing the trunk channel 343. Here, a first fluid is supplied through the inlet port 340 to the trunk channel 343 and fills the branch channels 344 as it progresses through the device 330. After the branch channels 344 are filled, the first fluid remaining in the trunk channel 343 adjacent to the branch channels 344 may be flushed completely out of the device 330 through the serpentine reservoir channel 345, via 346, and outlet port 341, or may alternatively just be flushed past the branches 344 into the reservoir channel 345. In the latter case, surplus first fluid may remain in the reservoir channel 345 while the plugs of first fluid are forced through the porous membrane 334 so long as sufficient outlet resistance is provided ahead of the surplus first fluid—such as may be accomplished by closing an external valve (not shown) in communication with the outlet port 341. In an alternative embodiment, a reservoir for surplus fluid may be configured as one or more chambers rather than a serpentine channel. One utility of providing a reservoir for surplus first fluid is to preserve the surplus for further use, such as may be desirable when the fluid is particularly valuable and/or only a limited quantity of first fluid is available. This occurs frequently when manipulating fluids such as purified DNA or genomic materials, for example. In whatever application, the surplus fluid remaining in the reservoir may be extracted for further storage, use, or processing.

Generally, branch channels having various volumes may be constructed by altering the channel dimensions using any of a number of different fabrication methods. If, for example, a sandwiched stencil fabrication method is used, and the desired branch channel is straight with a rectangular cross-section, then it is easy to calculate the channel volume as the product of channel length, width, and height. Channels having a height of about 50 microns may be cut in a double-sided self-adhesive film having a carrier thickness of about 25-microns and adhesive about 12.5-microns thick on each side, and then sandwiched between adjacent layers. Branch channel volumes between 50-nanoliters and 1-microliter or larger may be defined in the above-mentioned 50-micron-thick double-sided film, as follows: cutting a channel 2 centimeters long by 1 millimeter wide yields a volume of 1 microliter; a channel 4 millimeters long by 500 microns wide yields a volume of 100 nanoliters; and a channel 4 millimeters long by 250 microns wide yields a volume of 50 nanoliters. More complex channels, and channels having larger or smaller volumes may be constructed.

Figure 3A:
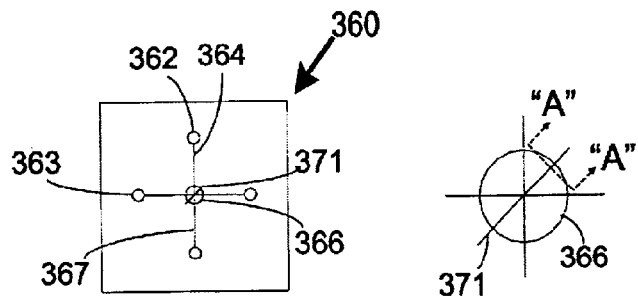
FIG. 3A is a top view of a microfluidic metering device in accordance with another aspect of the present invention.
Figure 3B:
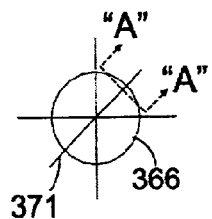
FIG. 3B is a partial top view of the device of FIG. 3A.
Figure 3C:
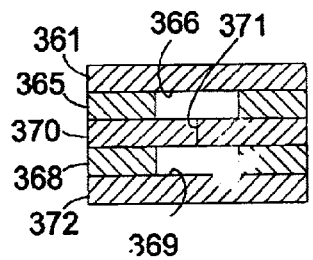

Referring to FIGS. 3A–3C, a simple microfluidic combinatorial mixing device 140 is constructed in five layers. FIG. 3A is a top view of the device 360; FIG. 3B is an expanded top view of a portion of the device 360 illustrating section lines "A"—"A"; FIG. 3C is a cross-sectional view of a portion of the device 360 along section lines "A"—"A". The first layer 361 includes two pairs of ports 362, 363 each pair associated with a channel. A first channel 364 defined in the second layer 365 delivers fluid to a first chamber 366, and second channel 367 defined in the fourth layer 368 intersects the first channel 364 and delivers fluid to a second chamber 369. The first and second chambers 366, 369 are separated by the third layer 370, in which a slit 371 is defined along the boundary between the two chambers 366, 369. A fifth layer 372 defines the lower boundary of the second chamber 369. In a preferred embodiment, the first and fifth layers 361, 372 are made of a polymeric film, the second layer 365 is made of a double-sided tape, the third layer 370 is made of single-sided tape with the adhesive facing down, and the fourth layer 368 is made of single- or double-sided tape. Preferably, at least one layer is formed of a thermoplastic material.

In operation, a first fluid plug is formed in the first chamber 366 when the first channel 364 is filled, and a second fluid plug in the second chamber 369 is formed when the second channel 367 is filled. The slit in the third layer 371 is held shut by the adhesive on the bottom side of the third layer 370. Once the plugs are formed, the ports 362, 363 to each channel 364, 367 are sealed (such as by heat sealing). Thereafter, the slit 371 in the third layer 370 is ruptured, breaking the adhesive seal between the chambers 366, 369 to allow the plugs to diffuse together. This rupture may be advantageously accomplished by bending the device 360 along the direction of the slit 371. Alternatively, establishing pressure differential between the chambers 366, 369 can rupture the adhesive seal.

Figure 4A:
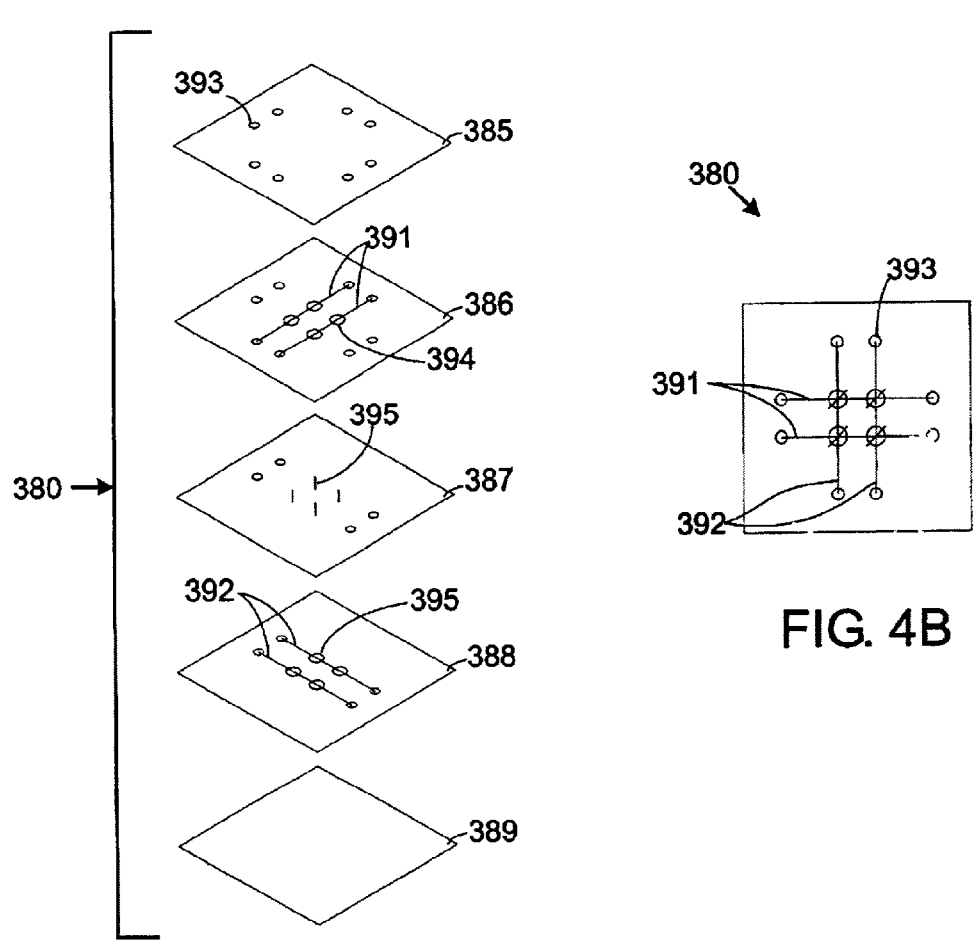
FIG. 4A is an exploded perspective view of a microfluidic metering device in accordance with another aspect of the present invention.
Figure 4B:
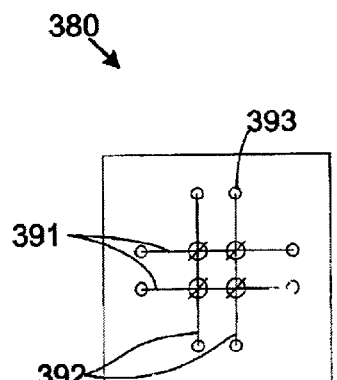
FIG. 4B is a top view of the assembled device of FIG. 4A.

One advantage of the design according to FIGS. 3A–3C is that it can be multiplexed without adding further layers or complexity. For example, FIGS. 4A–4B show a 2×2 combinatorial plug mixer sharing the same basic five-layer design as the device shown in FIGS. 3A–3C, except the device 380 has four channels 391, 392 in communication with eight ports 393 in the first layer 385, four chambers 394 in the second layer 386, four slits 396 defined in the third layer 387, and four chambers 395 in the fourth layer 388. Different fluids may be added to each of the four channels 391, 392. The chambers 394, 395 can then be sealed from the channels 391, 392. For example, a heat probe (not shown) may be used to locally seal the channels 391, 392. If different fluids are used in each of the four channels 391, 392, then the four mixing chambers 394, 395 will each have different plug combinations. Much larger and/or denser combinatorial mixers may be prepared according to the same basic design.

In another embodiment, porous membrane valves can be used in a device to create a microfluidic metering system. Referring to FIG. 5A, an exploded view of a microfluidic device 149 is shown that was constructed from seven layers 401–407, including stencil layer 402, 406. Defined in the layers are channels 412–416, vias 417–417A, an entry port 418, and exit ports 419. Layer 404 is constructed from five different porous materials. Area 420 is 40-micron pore size UHMWPE, area 421 is 30-micron pore size UHMWPE, area 422 is 20-micron pore size UHMWPE, area 423 is 10-micron pore size UHMWPE, and area 424 is 1-micron pore size UHMWPE. Layers 403 and 405 are constructed from single-sided adhesive tape with the adhesive facing stencil 404, stencil layers 402 and 406 are double sided adhesive tape, and layers 401 and 407 are polymeric films with no adhesive. The assembled device 400 is shown in FIG. 5B. In use, a small portion of fluid is injected at the entry port 418 and passes down channel 412 until it reaches the end of the channel. The portion of fluid should be large enough to fill the metering portion of channel 412, but not greater than the total volume of channels 412 and 416. The excess fluid then passes through porous membrane area 420 into waste channel 416 since the pressure drop across membrane area 420 is the weakest of the five areas 420–424. Air is injected behind the fluid to drive the flow. Once the waste fluid reaches the end of channel 416, the fluid in channel 412 passes through membrane area 421, since the pressure drop across area 421 is weaker than the drop across area 424 at the exit of the channel 416. The plug of fluid passes through membrane area 421 and then is split equally in multiple channels 414. The volume of each channel 414 is exactly one-half the volume of the metering portion of channel 412. Once channel 414 is filled, the two plugs of fluid pass through area 422 and enter into channels 413. Each channel 413 is exactly one-quarter of the volume of channel 412. Once each channel 413 is filled, the fluid passes through membrane area 423 and goes to the exit ports 419. In summary, this device 400 takes an uncertain volume of fluid, meters off a known amount, and splits that sample into four equal portions or plugs for further analysis. The porous membrane valves control the fluidic pathway in the device.

In a preferred embodiment, different porous membranes can be used to control the flow rate (and therefore total volume) down a given channel. At a given backpressure, membranes of different porosities and void volumes will have different flow-through rates. Many factors can affect the profile of fluid flow rate versus backpressure for flow through a given porous material. These factors include, but are not limited to, the chemical nature of the membrane, pore size of the membrane, geometry and shape of the pores in the membrane, amount of surface area of the membrane, size of the opening where the fluid will flow through, and other parameters. The nature of the fluid that is flowed will also have an effect. Fluid factors include but are not limited to composition of the fluid, surface tension of the fluid, viscosity of the fluid, temperature, and compressibility of the fluid.

Figure 6A:
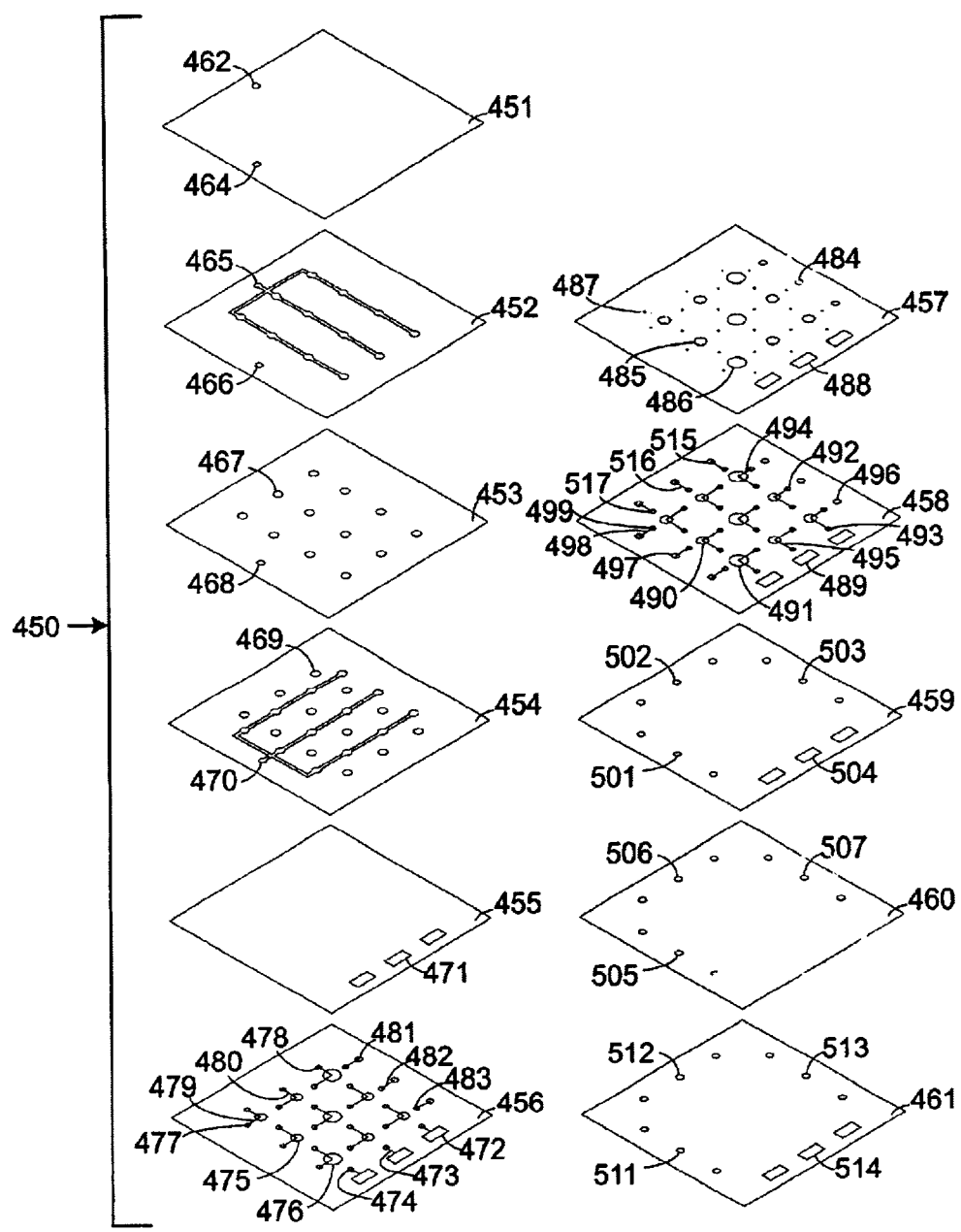
FIG. 6A is an exploded perspective view of a microfluidic metering device in accordance with another aspect of the present invention.
Figure 6B:
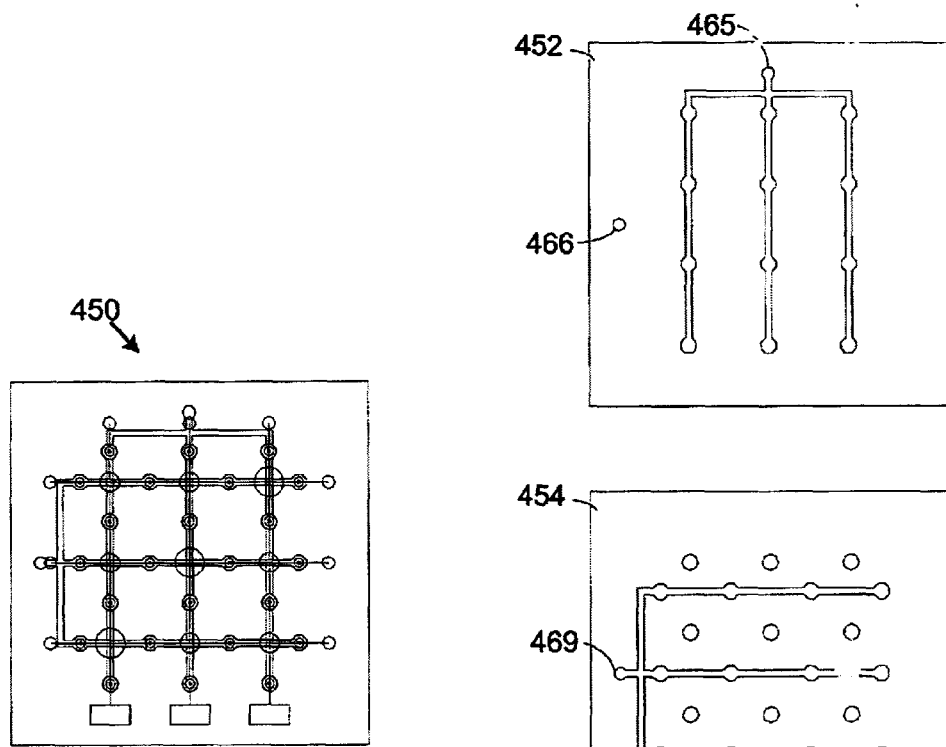
FIG. 6B is a top view of the assembled device of FIG. 6A.
Figure 6B:
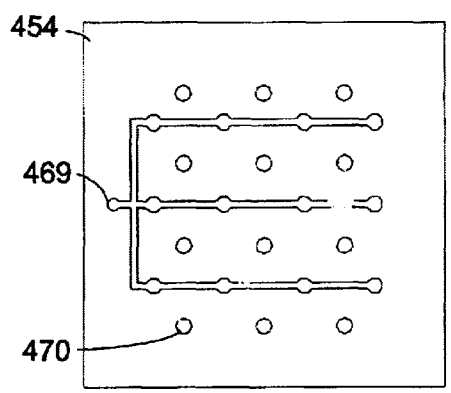
Figure 6C:
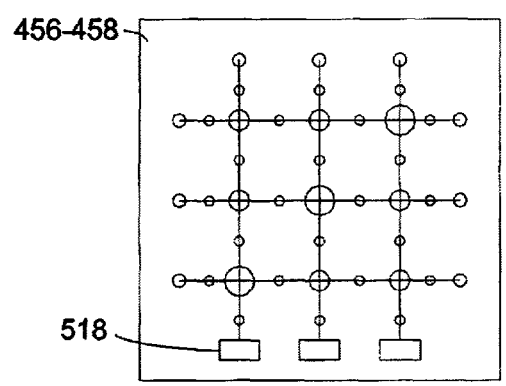
FIG. 6C is an exploded perspective view of a portion of the device of FIG. 6A.

In another embodiment, different combinations of more than two fluids may be mixed in various proportions. FIGS. 6A–6C show an example of a fluidic metering and mixing device 450 according to one embodiment permitting three different samples, all of uncertain volumes, to be metered and then mixed in various known proportions in three separate mixing chambers. Referring to FIG. 6A, the device 450 was constructed from eleven layers, including a substrate and stacked layers. The first layer 451 was a rigid 2¼"×2¼" square acrylic substrate having two fluidic inlet ports 462, 464, preferably used to admit pressurized air to the device 450. The second layer 452 (along with the fourth, sixth, and eighth layers 454, 456, 458) was constructed from a 5.5 mil (138 micron) double-sided tape having a polyester carrier and acrylic adhesive on both sides. Defined in the second layer 452 was a first valve channel network 465 used to control valves affecting fluid flow through the seventh layer 457. An expanded view of the first valve channel network 465 in the second layer 452 is provided in FIG. 6C. Further defined in the second layer 452 was a via 466 to permit fluidic (preferably gaseous; more preferably air) passage to a second valve channel network 470 located in the fourth layer 454. The third layer 453, which was constructed from 2 mil (50 micron) polyester film, defined a via 468 for fluidic passage to the fourth layer 454 along with twelve apertures 467 aligned with and continuing the first valve channel network 465 downward. The fourth layer 454 defined a second valve channel network 470 and twelve apertures 469 further continuing the first valve channel network 465. An expanded view of the second valve channel network 470 in the fourth layer 454 is provided in FIG. 6C. The fifth layer 454 was a flexible membrane made of a 4 mil (100 micron) latex film, used as the valving material in the sixth and seventh layers 456–457. Since the flexible membrane was opaque, the fifth layer 455 further defined windows 471 to permit mixing regions (e.g. mixing chamber portions 472 located in the sixth layer 456) to be viewed from above. The sixth layer 456 defined portions of six small plug chambers 475 and three large plug chambers 476, along with apertures 477, 478 and channels 479, 480 in fluid communication with the chambers 475, 476. Further defined in the sixth layer 456 were mixing chambers portions 472 with associated channels 473 and vias 474, and peripheral vias 481 with associated channels 482 and medial vias 483. The seventh layer 457 was constructed of a 2-mil (50 micron) polyester film, and defined three peripheral vias 484, six small chamber portions 485 and three large chamber portions 486 aligned with their counterparts in the sixth layer 456, along with twenty-four small apertures 487 each providing a sealing area for the flexible membrane 455 when deformed downward by the valve channel networks 465, 470. The eighth layer 458 defined further portions of the six small chambers 490 and three large chambers 491 along with apertures 492, 493 and channels 494, 495 in fluid communication with the chambers 490, 491. Further defined in the eighth layer 458 were mixing chamber portions 489, peripheral vias 496, and additional peripheral vias 497 along the opposite edge of the layer 458 with associated channels 498 and apertures 499. The ninth layer 459 was a 1.8 mil (45 micron) single-sided tape with downward-facing acrylic adhesive, and defined three sets of peripheral vias 501, 502, 503 and mixing chamber portions 504. The tenth layer 460 was fabricated from a porous hydrophobic polyethylene film having 2.5–4.5 micron pore size to ventilate the mixing chamber portions 489 in the ninth layer 459 and above. Defined in the tenth layer 460 were three sets of peripheral vias 505, 506, 507 aligned with the corresponding vias 501, 502, 503 in the ninth layer 459. Finally, the eleventh layer 461 was formed from a polyester carrier single-sided tape having adhesive facing up, and defined three sets of fluidic ports 511, 512, 513 (aligned with the vias 505, 506, 507 in the tenth layer 460) and ventilation windows 514 to permit gaseous communication between the mixing chamber portions 504 and the environment through the porous tenth layer 460.

Before the metering and mixing device was operated, the device 450 was connected to a high-pressure (about 10 psi) air source and isolation valves (not shown) from above at the ports 462, 464; to a low-pressure (about 0.5 psi) air source from below at the ports 512; and to three fluid sources from below at the ports 511, 513 to provide fluidic inlet and outlet. To prepare the device 450 to be filled with fluid, the first valve network 465 was operated. By supplying pressurized air to the first network 465, air was transmitted through the apertures 467, 469 in the third and fourth layers 453, 454 to press against and locally deform the flexible fifth layer 455 downward in twelve locations aligned with the apertures 467, 469. This localized deformation of the flexible fifth layer 455 pressed through the apertures 478 in the sixth layer 456 to seal twelve of the apertures 487 in the seventh layer 457, thus preventing fluidic passage. With the first valve network activated (valves closed), three fluids (preferably liquids) to be metered and mixed were supplied to the device 450 from below, at a pressure of about 0.5 psi, through the inlet ports 511 and transmitted upward through the vias 505,

501 to fill the plug chamber portions 475, 476, 485, 486, 490, 491 located in the sixth, seventh, and eighth layers 456, 457, 458. Specifically, apertures 477, 483, 481, 484, 497, 499, 492 channels 479, 482, 498, 494 and chambers 475, 476, 485, 486, 490, 491 in the sixth, seventh and eighth layers 456, 457, 458 formed continuous serpentine fluidic passages from one side of the device 450 to the other and then exit the device 450 through peripheral vias 484, 496, 503, 507 and the outlet ports 513. An expanded view of the superimposed sixth, seventh, and eighth layers 456, 457, 458 is provided in FIG. 6C. In this manner, three fluidic streams of indeterminate volume were introduced into the device 450 to fill the chamber portions 475, 476, 485, 486, 490, 491 in parallel to meter each fluid into a known amount defined by the volume of each of the nine resulting chambers. With the plug chambers filled, the second valve channel network 470 was operated (with pressurized air) to deform the flexible fifth layer 455 downward to seal against twelve of the apertures 487 in the seventh layer 457, thus preventing fluid flow therethrough. Additionally, pressure to the first valve channel network 465 was released. Low pressure air (about 0.5 psi) intended to push the contents of the plug chambers 475, 476, 485, 486, 490, 491 into three mixing chambers 472 was then applied through the ports 512 in the eleventh layer 461 and the vias 502, 506 in the ninth and tenth layers 459, 460 into the eighth layer 458. The channels 480, 473, 495, 516, chambers 475, 476, 485, 486, 490, 491, and apertures 478, 474, 487, 493, 515, 517 in the sixth, seventh, and eighth layers 456, 457, 458 defined another serpentine network of passages for this air, permitting the air to "push" the contents of the plug chambers 475, 476, 485, 486, 490, 491 into the mixing chambers 472 (which continue between the fifth and night layers 455–459 respectively in mixing chamber portions 471, 472, 488, 489, 504). Once present in the mixing chambers 518, the low-pressure air was expelled from the device through the porous tenth layer 460 and adjacent windows 514. In this manner, three different fluids were metered and mixed in three different proportions, by virtue of the varied sizing of the plug chambers. The resulting mixtures were visible (for optical or other detection) from above through the optically transparent first through fourth layers 451, 452, 453, 454 and the windows 471 defined in the opaque fifth layer 455. Detection technology can be added to provide on-board analysis of the samples. The assembled device 450 is shown in FIG. 6B.

In another aspect of the invention, a plug may be formed without branch channels, but instead by injecting a second fluid into a channel containing a first fluid. For example, referring to FIGS. 7A–7B, a fluidic metering device is constructed in five layers. The first layer 531 serves as a cover. The second layer 532 defines a via 538 and channel 539 in fluid communication with a short segment 540. The third layer 533 defines a via 541 and an aperture 542 aligned below the segment 540 in the second layer 532. Although the aperture 542 could be formed in various shapes, it is preferably shaped as a narrow slit to minimize the contact distance along the narrow portion 544A of the primary channel 544 defined in the fourth layer 534, and thereby reduce volumetric uncertainty when separating a first fluid into a fluidic plug. The fourth layer 534 defines a via 545 and a primary channel 544 composed of a narrow portion 544A and a wide portion 544B. The fifth layer 535 defines inlet ports 546, 548 for a first fluid and a second fluid, respectively, and a fluidic outlet port 549. The second fluid inlet port 548 is in fluid communication with the vias 538, 541, 545, which in turn provide a second fluid through the channel 539, short segment 540, and slit 542 to the channel 544 in the fourth layer 534. The five layers may be formed of various materials and may have various thicknesses sufficient to ensure that the internal channels are microfluidic scale. If bare films are used, then adhesive may be placed between each layer. Alternatively, one or more layers may be turf composed of self-adhesive material. For example, the second and fourth layers may be formed from double-sided tape, or one or more layers may be formed from a single-sided self-adhesive film. The assembled device 530 is shown in FIG. 7B.

Figure 8A:
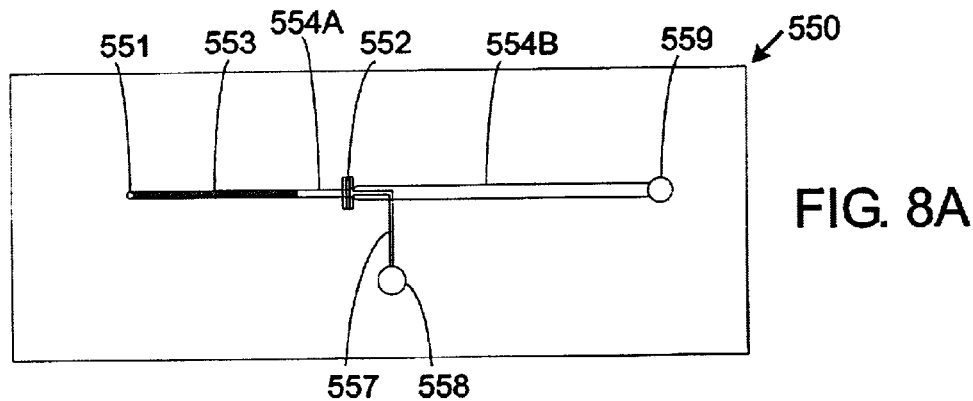
FIG. 8A is a top view of the device of FIGS. 7A–7B in a first operational state.
Figure 8B:
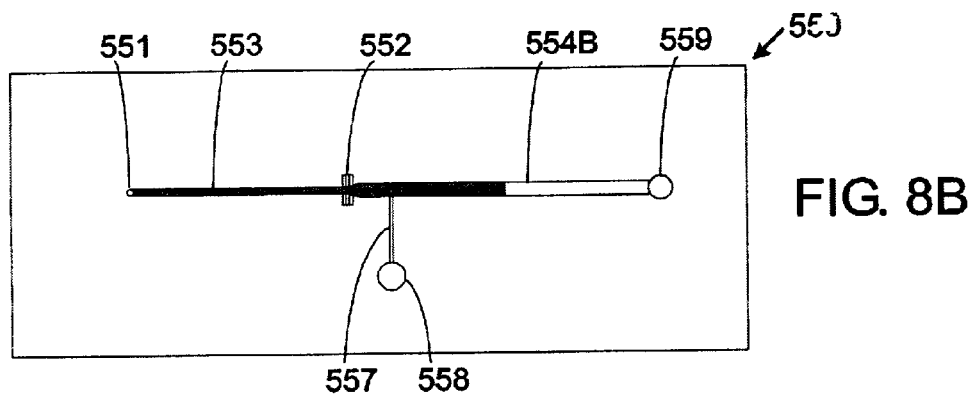
FIG. 8B is a top view of the device of FIGS. 7A–7B in a second operational state.
Figure 8C:
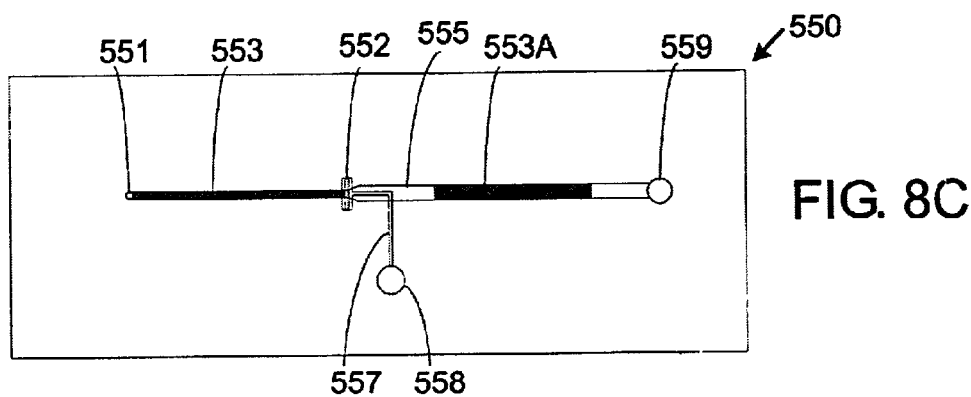

Operation of a device according to the embodiment of FIGS. 7A–7B is shown in FIGS. 8A–8C. Referring to FIG. 8A, a first fluid is supplied through the first fluid inlet port 551 into the narrow channel segment 554A. As the first fluid 553 (shaded) fills the narrow portion 554A, it flows past the aperture 552 and into the wide portion 554B, as depicted in FIG. 8B. When a desired amount of the first fluid is present in the wide portion 554B of the primary channel 554 (composed of portions 554A, 554B), a second fluid having a pressure greater than that of the first fluid may be introduced to primary channel 554 by way of the second fluid inlet port 558 and channel 557. In a preferred method utilizing the device 550, the second fluid is a gas, such as (but not limited to) air, nitrogen, carbon dioxide, or argon. The second fluid 555 is communicated through the slit 552 into the narrow portion 554A where it separates the first fluid into a plug 553A. By either maintaining pressure within the first fluid or providing a check valve to prevent reverse flow of the first fluid, introduction of the second fluid to the primary channel 554 displaces the plug 553A in a direction toward the wide portion 554B and the outlet port 559. If the second fluid is a gas, one advantage of providing a narrow portion 554A and introducing the second fluid there is that a single pocket of gas filling the entire width of the portion 554A (and thereby separating the first fluid into a plug) is more readily formed, as opposed to a series of small bubbles not filling a channel that might result if a gas were to be introduced into a much wider channel. Providing a wide portion 554B permits the primary channel 554 to fill more slowly for a given total flow rate, which may be advantageous to reduce uncertainty in the volume of the resulting plug if there exists significant response delay in supplying the second fluid to the device 550. FIG. 8C shows the formation of a plug 553A of first fluid following introduction of the second fluid 555 to the device 550.

Figure 9A:
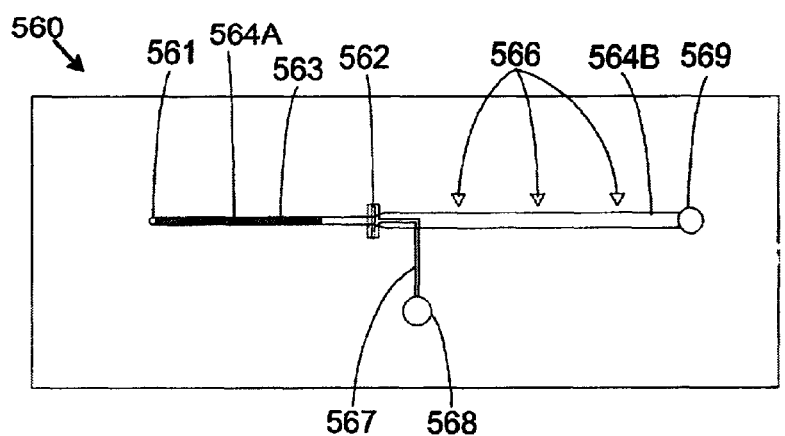
FIG. 9A is a top view of an enhanced version of the device of FIGS. 7A–7B in a first operational state.
Figure 9B:
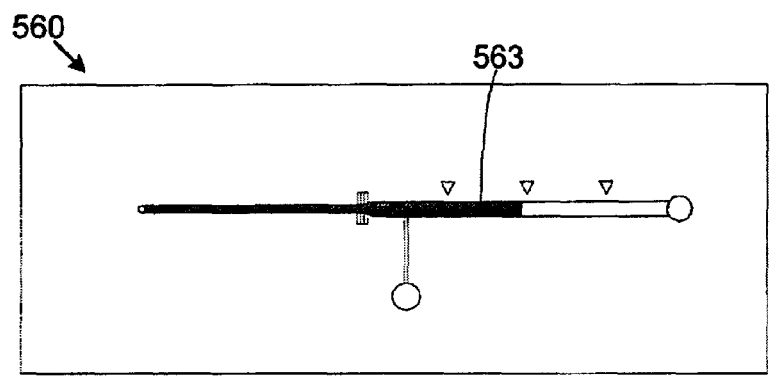
FIG. 9B is a top view of the device of FIG. 9A in a second operational state.
Figure 9C:
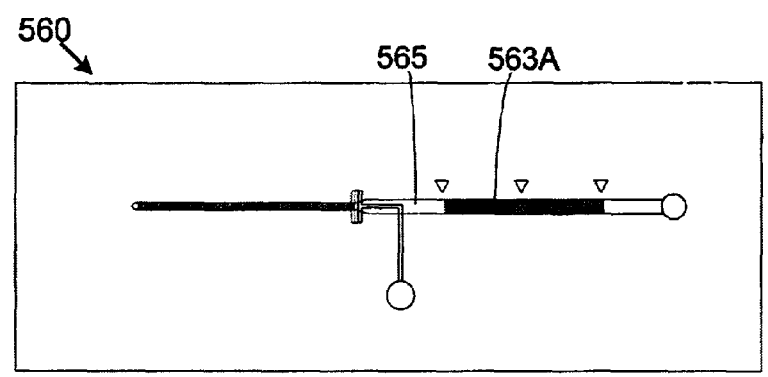
FIG. 9C is a top view of the device of FIG. 9A in a third operational state.

An enhanced version of the embodiment provided in FIGS. 8A–8C is shown in FIGS. 9A–9C. Indicating marks 566 are provided downstream of the slit 562 along the wide channel portion 564B to further reduce uncertainty in the volume of the resulting plug. As before, a first fluid is introduced to the device through a first fluid inlet port 561 to a narrow portion 564A, as shown in FIG. 9A. After the fluid fills the narrow portion 564A, it flows into the wide segment 564B. Separating a desired plug volume is aided by utilizing the indicating marks 566 along the primary channel 564, preferably along the wide portion 564B. As the fluid approaches an indicating mark 566 (such as shown in FIG. 9B), supply of the second fluid to the device 560 may be activated, such as by operating an external valve (not shown). The second fluid is provided through a second fluid inlet port 568, a channel segment 567, and a slit 562 into the narrow portion 564A, where it displaces and separates the first fluid into a plug 563A. FIG. 9C depicts the plug 563A of first fluid downstream of a discrete amount of second fluid 565. After supply of the second fluid begins, the supply may be continuous or interrupted if desired. A continuous supply of second fluid would serve to "push" the plug 563A of first fluid thereafter within the device 560 to a desired location.

Figure 10A:
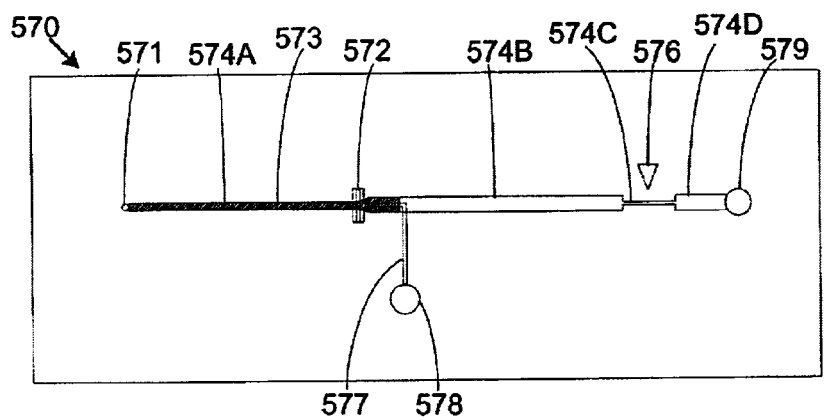
FIG. 10A is a top view of a further enhanced version of the device of FIGS. 7A–7B in a first operational state.
Figure 10B:
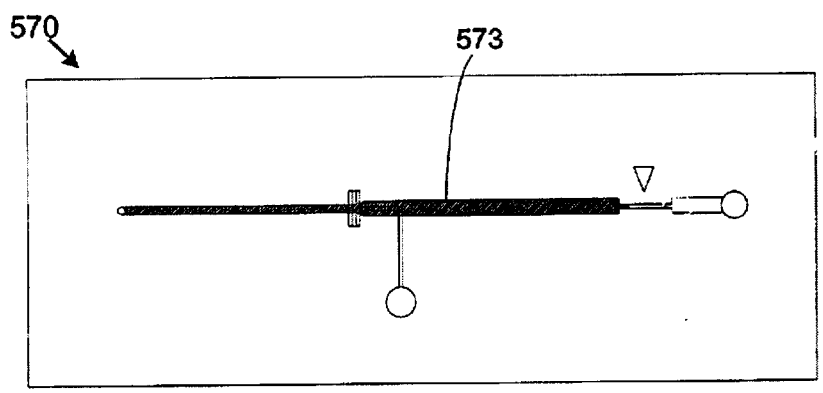
FIG. 10B is a top view of the device of FIG. 10A in a second operational state.
Figure 10C:
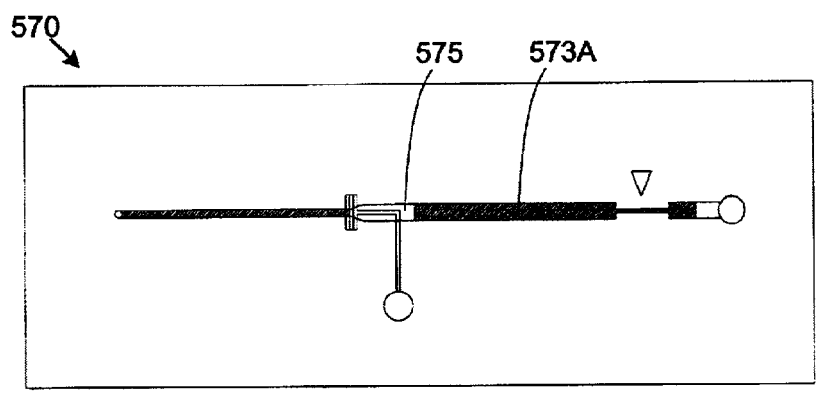
FIG. 10C is a top view of the device of FIG. 10A in a third operational state.

A further enhanced metering device embodiment is depicted in FIGS. 10A–10C. The primary channel 574 (including segments 574A, 574B, 574C, 574D) has a reduced channel segment 574D serving as a volumetric indicator to help indicate when a desired volume of first fluid is present downstream of the slit 572. As shown in FIG. 10A, a first fluid is provided to the device 570 through an inlet port 571 and travels within a narrow portion 574A, past a slit 572 (where a second fluid may be added) and into a wide portion 574B of the primary channel 574. When the first fluid completely fills the wide portion 574B, the fluid begins to flow into the reduced channel segment 574C, as shown in FIG. 10B. The presence of fluid in the reduced segment 574C may be used to signal the need to introduce a second fluid to separate the first fluid into a plug. Assuming that the first fluid is moving relatively slowly and/or the response delay in providing the second fluid is not a significant problem, then the reduced channel segment 574C helps reduce volumetric uncertainty when metering a plug of the first fluid. The reduced channel segment 574C may have a nominal cross-sectional area of one-half, one-quarter, one-eighth, one-sixteenth, or an even smaller fraction of the area of the primary channel segment 574B located upstream. One or more secondary indicating mark(s) 576 may also be provided, either along the primary channel segment 574B or the reduced channel segment 574C to further reduce volumetric uncertainty in metering a fluid plug. FIG. 10C shows the formation of a plug 573A of first fluid following introduction of a second fluid 575. Introduction of the second fluid 575 displaces the first fluid plug 573A downstream through the reduced segment 574C and toward the outlet port 579.

Figure 11:
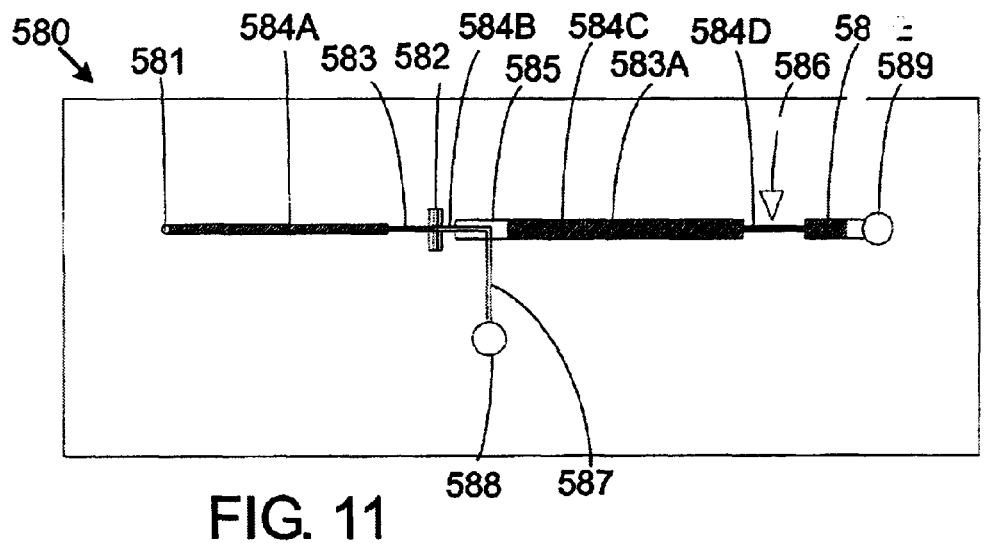
FIG. 11 is top view of a metering device in accordance with another aspect of the present invention.

In another embodiment depicted in FIG. 11, a metering device 580 includes a further narrowed inlet channel segment 584B in fluid communication with the slit 582 through which the second fluid is introduced, so as to further reduce volumetric uncertainty in defining a plug of first fluid. Generally (using a device according to the present invention), when a second fluid is injected into a channel containing a first fluid so as to separate the first fluid to form a fluidic plug, one source of volumetric uncertainty exists at the region where the second fluid is injected into the first fluid, since the injection must occur over an area and it is difficult to predict the precise separation zone within that area. By providing an inlet channel segment 584B having a particularly small area, volumetric uncertainty in the plug of first fluid due to the unpredictable location of the separation zone is reduced. The inlet channel segment 584B may have a nominal cross-sectional area of one-half, one-quarter, one-eighth, one-sixteenth, or an even smaller fraction of the area of the wider primary channel segment 584C located downstream. In operation, a first fluid is provided to the device 580 through the first fluid inlet port 581 into a first channel portion 584A and then to the inlet channel segment 584B past a slit 582 through which a second fluid may be injected. From the inlet channel segment 584B, the first fluid flows into the wide channel portion 584C and into a reduced segment 584D. When a desired volume of first fluid is present in the primary channel 584C downstream of the slit 582, a second fluid may be introduced into the inlet channel segment 584B through a second fluid inlet port 588, a channel segment 587, and the slit 582 to separate the first fluid into a plug 583A. The second fluid is preferably a gas, but may alternatively be a liquid. A desired volume may be indicated, for example, by the presence of first fluid in the reduced channel segment 584D or proximity of the first fluid to an indicating mark 586. After the plug 583A of first fluid is defined, it may be transported within the device 580 to a desired location (e.g. in the direction of the outlet port 589) by continued flow of the second fluid 585.

Figure 12A:
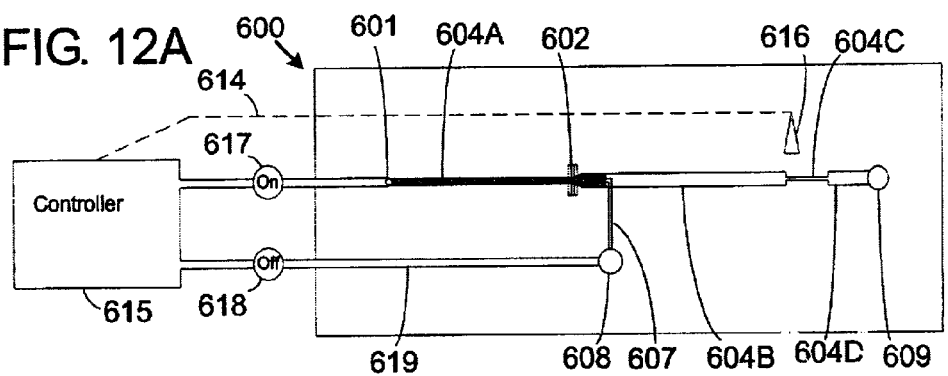
FIG. 12A is a top view of a metering device in accordance with another aspect of the present invention in a first operational state.
Figure 12B:
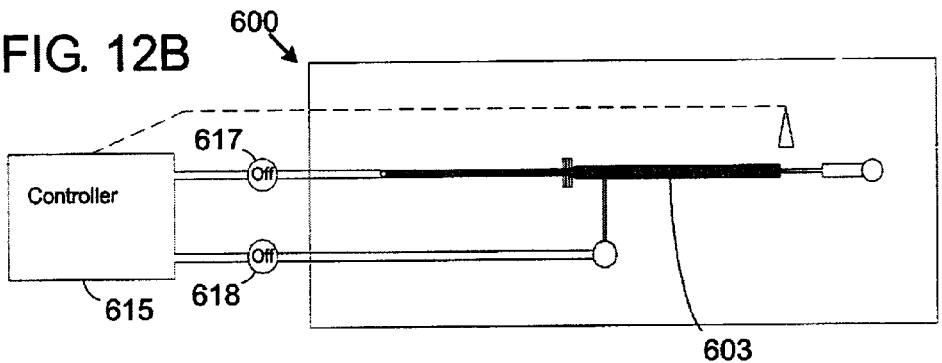
FIG. 12B is a top view of the device of FIG. 12A in a second operational state.
Figure 12C:
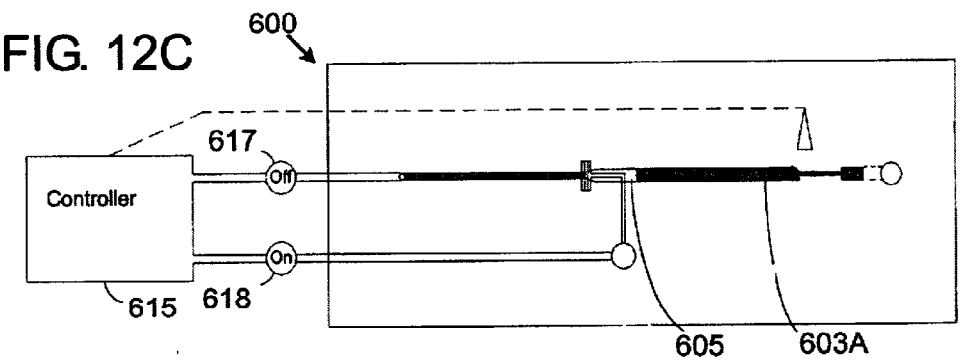
FIG. 12C is a top view of the device of FIG. 12A in a third operational state.

Metering of a fluidic plug from a larger bulk volume may be automated. Referring to FIGS. 12A–12C, in one embodiment a fluidic metering device 600 may be connected to a controller 615 with a connection 614 for receiving input from a sensor 616 for detecting the presence or quantity of fluid and controlling valves 617, 618 to manipulate fluids within the device 600. The microfluidic device 600 includes a first fluid input 601 and a narrow channel portion 604A leading to a wide channel portion 604B, with an narrow aperture or slit 602 aligned perpendicular to the narrow channel portion 604A adjacent to the transition between channel portions 604A, 604B. A first fluid may be provided to the narrow channel portion 604A by way of a first fluid inlet port 601. Downstream of the narrow channel portion 604A is a wide channel portion 604B, which has a reduced portion 604C and adjacent sensor 616 for detecting presence of fluid in the reduced portion 604C. A second fluid may be provided to the slit 602 by way of a channel segment 607 and a second fluid inlet port 608 in communication with a fluid supply 619. In operation, the controller opens the first valve 617 (now in the "on" position), and the first fluid is provided through the narrow channel portion 604A and past the slit 602, as depicted in FIG. 12A. The second valve 618 is initially closed. The first fluid 603 eventually fills the wide portion 604B and flows into the reduced portion 604C. When the presence of first fluid in the reduced portion 604C is detected by the sensor 616, a signal is provided to controller 614 and the controller 614 closes the first valve 617 (now in the "off" position) to prevent further flow of the first fluid, as depicted in FIG. 12B. Thereafter, the controller 615 opens the second valve 618 (now in the "on" position) to permit a second fluid 605 to be introduced into the device 600 and into the narrow channel portion 604A at the slit 602, thus separating the first fluid 603 into a plug 603A and propelling the first fluid plug 603A through the reduced portion 604C and onward within the device 600 toward the exit port 609. In this manner a plug of first fluid may be metered, separated within a device from a larger fluidic volume, and transported. Preferably, but not necessarily, the first fluid is a liquid and the second fluid is a gas. As would be recognized by one skilled in the art, various controllers, sensors, and valves could be used with the present invention. Preferably, however, the sensor 616 is an optical sensor, the controller 615 is microprocessor-based, and the valves 617, 618 are fast-acting solenoid valves.

Figure 13:
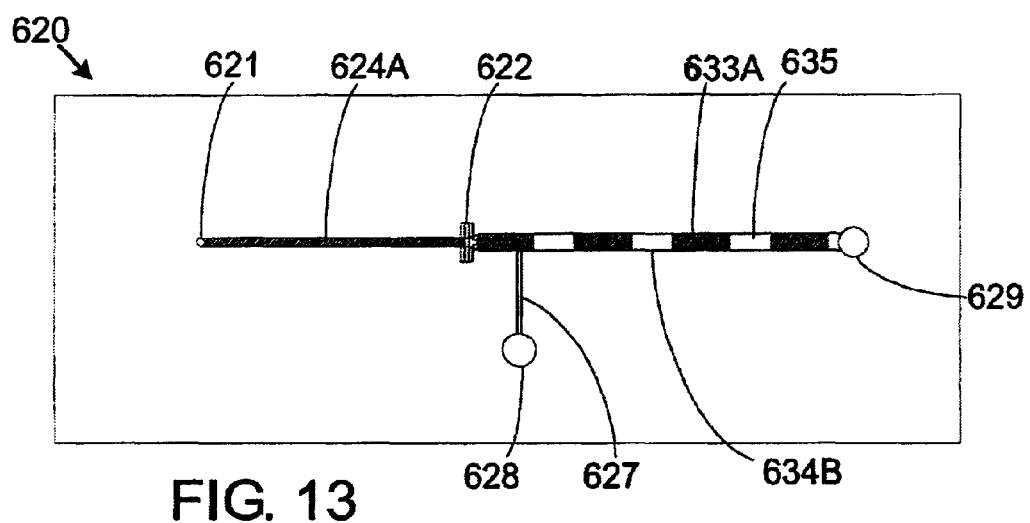
FIG. 13 is top view of a metering device in accordance with another aspect of the present invention.

In another embodiment sharing a configuration similar to those described previously, a plurality of plugs of fluid may be metered from a bulk fluid. Referring to FIG. 13, a microfluidic metering device 620 receives a stream of a first fluid and a stream of a second fluid, preferably controlled by external valves (not shown). Preferably, the two fluids are substantially or relatively immiscible. The two fluids may be liquids, or one a liquid and the other a gas. If the first fluid is a liquid and the second fluid is a gas, then the injection zone (preferably configured as a slit 622 adjacent to a narrow channel portion 624A) preferably includes a gas-permeable membrane to prevent liquid from entering the gas supply network (e.g. channel 627 and port 628). As an alternative to the membrane, a one-way valve (not shown) could be situated in the injection zone. The supply conditions of the first and second fluids are selected to generate discrete plugs of fluid in the channel. Potential alterations to the supply conditions include, for example, supply pressure, supply duration, flow rate, and the nature of the two fluids to be supplied to the device. In operation, a first fluid flows into the device through an inlet port 621 and into a narrow channel portion 624A. The first fluid passes an aperture 622 in fluid communication with the narrow channel portion 624A. A second fluid is supplied to the narrow channel portion 624A through the aperture 622 by way of a second fluid inlet port 628 and a channel segment 627. The supply conditions of the first and second fluids are selected to form alternating plugs 633A, 635 of desired volume downstream of the aperture 622 that flow into a wide channel portion 634B and may be transported for further use or analysis within the device 620, or taken off-board through an outlet port 629. The supply conditions may be predetermined or varied while the device 620 is in operation, and one or more fluids may flow intermittently. Utilizing such a device and method, a plurality of plugs may be formed.

In another embodiment, a fluid plug of desired volume may be metered from a bulk fluid by applying a vacuum/low pressure to a microfluidic metering device. Referring to FIGS. 14A–14B, a metering device 650 is constructed in four layers. The first layer 651 is a porous membrane (such as, for example, porous hydrophobic polyethylene film having 2.5–4.5 micron pore size) permitting the passage of air but not most liquids. The second layer 652 defines an aperture 655 that is preferably configured as a slit, positioned above and perpendicular to a channel 656 located in the third layer 653. The third layer 653 defines a composite channel 656 having a first portion 656A and a second portion 656B. The fourth layer 654 defines two ports 658, 659 aligned with either end of the composite microfluidic channel 656. In operation, a first fluid is supplied to the first channel portion 656A through the first port 658, and a vacuum source and external valve (not shown) are connected to the second port 659. The first fluid and porous first layer 651 are selected to prevent flow of the first fluid through the first layer 651, so that as the fluid fills the first channel portion 656A, thereafter it continues into the second channel portion 656B. As the first fluid flows into the second channel portion 656B, a plug of desired volume may be defined by operating the external valve (not shown) to expose the leading portion of the first fluid to vacuum (or a low pressure region). The result of applying the vacuum is to separate a plug of fluid having a volume equal to the volume of the channel portion between the slit 655 and the leading edge of the first fluid, since the vacuum will draw air into the device behind the plug through the slit 655 and porous first layer 651. To assist in obtaining a plug of desired volume, an indicator, such as for example indicating marks 662 along the second channel portion 656B, may be provided. Other indicators, including narrowed or expanded regions along the second channel portion 656B, may be provided. In this manner, a plug of desired volume may be metered and split from a bulk fluid volume using a vacuum or other reduced-pressure region.

It is also to be appreciated that the foregoing description of the invention has been presented for purposes of illustration and explanation and is not intended to limit the invention to the precise manner of practice herein. It is to be appreciated therefore, that changes may be made by those skilled in the art without departing from the spirit of the invention and that the scope of the invention should be interpreted with respect to the following claims.

What is claimed is:

1. A method for generating a plurality of discrete plugs of fluid, the method comprising the steps of:

providing a microfluidic channel in fluid communication with a first fluid inlet and a second fluid inlet;

supplying a first fluid into the channel at the first fluid inlet; and supplying a second fluid into the channel at the second fluid inlet;

wherein the supply conditions of the first fluid and the second fluid are selected to generate the discrete plugs of fluid in the channel.

2. The method of claim 1 wherein the first fluid and the second fluid are substantially immiscible.

3. The method of claim 1 wherein the first fluid or the second fluid is supplied intermittently to the channel.

4. The method of claim 1 wherein the flow rate of the first fluid or the second fluid is varied with time.

5. The method of claim 1 wherein the first fluid is a liquid and the second fluid is a gas.

6. The method of claim 5 wherein the liquid is substantially pure.

7. The method of claim 5 wherein the second fluid inlet comprises a gas-permeable membrane.

8. The method of claim 1 wherein the microfluidic channel, the first fluid inlet, and the second fluid inlet are defined in a multi-layer microfluidic device made with sandwiched stencil layers.

9. A method for metering a plug of fluid from a larger fluidic volume, the method comprising the steps of:

providing a primary microfluidic channel segment in fluid communication with a first fluid inlet and a second fluid inlet;

supplying a first fluid through the first fluid inlet into the primary channel segment; and introducing a second fluid through the second fluid inlet into the primary channel segment;

wherein the first fluid is supplied before the second fluid is introduced, the pressure of the second fluid exceeds the pressure of the first fluid, and the introduction of the second fluid divides the first fluid to generate a first fluid plug.

10. The method of claim 9 wherein a volumetric indicator for the primary channel segment is provided.

11. The method of claim 9 wherein the indicator comprises a transition between one or more channel segments and/or a chamber.

12. The method of claim 9 wherein the primary channel segment is in fluid communication with a reduced channel segment, the primary and reduced channel segments each having a nominal cross-sectional area, the nominal area of the reduced channel segment being significantly smaller than the nominal area of the primary channel segment, the method further comprising the steps of:

sensing the presence of fluid in the reduced channel segment; and responsive to the sensing step, introducing the second fluid into the primary channel segment.

13. The method of claim 12 wherein the sensing and introducing steps are automated.

14. The method of claim 12 wherein the nominal area of the reduced channel segment is less than about one-half of the nominal area of the primary channel segment.

15. The method of claim 12 wherein the nominal area of the reduced channel segment is less than about one-fourth of the nominal area of the primary channel segment.

16. The method of claim 12 wherein the nominal area of the reduced channel segment is less than about one-eighth of the nominal area of the primary channel segment.

17. The method of claim 9 wherein fluid is provided to the primary channel segment through an inlet channel segment, the primary and inlet channel segments each having a nominal cross-sectional area, and the nominal area of the inlet channel segment is smaller than the nominal area of the primary channel segment.

18. The method of claim 17 wherein the first fluid inlet is located along the inlet channel segment.

19. The method of claim 17 wherein the second fluid inlet is located along the inlet channel segment.

20. The method of claim 17 wherein the nominal area of the reduced channel segment is less than about one-half of the nominal area of the primary channel segment.

21. The method of claim 17 wherein the nominal area of the reduced channel segment is less than about one-fourth of the nominal area of the primary channel segment.

22. The method of claim 17 wherein the nominal area of the reduced channel segment is less than about one-eighth of the nominal area of the primary channel segment.

23. The method of claim 9 wherein the first fluid is a liquid and the second fluid is a gas.

24. The method of claim 23 wherein the liquid is substantially pure.

25. The method of claim 9 wherein the first fluid inlet comprises a first valve, and the second fluid inlet comprises a second valve.

26. The method of claim 9 wherein the second fluid inlet comprises a gas-permeable membrane.

27. The method of claim 9 wherein the primary channel segment, the first fluid inlet, and the second fluid inlet are defined in a multi-layer microfluidic device made with sandwiched stencil layers.

28. A device for metering a plug of fluid from a larger fluidic volume, the device comprising:
a primary microfluidic channel segment;
a first fluid inlet and a second fluid inlet each in fluid communication with the primary channel segment; and
means for indicating fluidic volume contained in the primary channel segment;
wherein a first fluid is supplied through the first fluid inlet into the primary channel segment, and responsive to the indicating means a second fluid is supplied through the second fluid inlet into the primary channel segment to divide the first fluid.

29. The device of claim 28 wherein the indicating means includes a mark disposed in or along the primary channel segment.

30. The device of claim 28 further comprising a reduced channel segment having a nominal cross-sectional area and in fluid communication with the primary channel segment;
wherein the primary channel segment has a nominal cross-sectional area greater than the nominal area of the reduced channel segment, and the indicating means includes means for sensing the presence of fluid in the reduced channel segment.

31. The device of claim 28 wherein the nominal area of the reduced channel segment is less than about one-half of the nominal area of the primary channel segment.

32. The device of claim 28 wherein the nominal area of the reduced channel segment is less than about one-fourth of the nominal area of the primary channel segment.

33. The device of claim 28 wherein the nominal area of the reduced channel segment is less than about one-eighth of the nominal area of the primary channel segment.

34. A device for metering a plug of fluid from a larger fluidic volume, the device comprising:
a primary microfluidic channel segment having a nominal cross-sectional area;
an inlet channel segment having a nominal cross-sectional area and in fluid communication with the primary channel segment; and
a first fluid inlet and a second fluid inlet each in fluid communication with the inlet channel segment;
wherein the nominal area of the inlet channel segment is smaller than the nominal area of the primary channel segment, a first fluid is provided to the primary channel segment, and a second fluid is supplied through the to the inlet channel segment to divide the first fluid to yield a plug.

35. The device of claim 34 wherein the nominal area of the reduced channel segment is less than about one-half of the nominal area of the primary channel segment.

36. The device of claim 34 wherein the nominal area of the reduced channel segment is less than about one-fourth of the nominal area of the primary channel segment.

37. The device of claim 34 wherein the nominal area of the reduced channel segment is less than about one-eighth of the nominal area of the primary channel segment.

* * * * *

UNITED STATES PATENT AND TRADEMARK OFFICE
CERTIFICATE OF CORRECTION

| | | |
|---|---|---|
| PATENT NO. | : 7,077,152 B2 | Page 1 of 1 |
| APPLICATION NO. | : 10/141011 | |
| DATED | : July 18, 2006 | |
| INVENTOR(S) | : Christoph D. Karp | |

It is certified that error appears in the above-identified patent and that said Letters Patent is hereby corrected as shown below:

On the title page, item [56]:
In the References Cited: Other Publications section, page 1, second column, "Voldman, Joel et al., *An Integrated Liquid Mixer/Valve*, "Journal of Microelectronmechanical Systems," vol. 9, No. 3, Sep. 2000, pp. 295-302" should be -- Voldman, Joel et al., *An Integrated Liquid Mixer/Valve*, "Journal of Microelectromechanical Systems," vol. 9, No. 3, Sep. 2000, pp. 295-302 --

Column 1, lines 6-7, "filed Jul. 7, 2007 and currently pending" should be -- filed Jul. 7, 2007 --.

Signed and Sealed this

Twenty-second Day of May, 2007

JON W. DUDAS
*Director of the United States Patent and Trademark Office*